(12) United States Patent
Huang et al.

(10) Patent No.: US 11,356,887 B2
(45) Date of Patent: Jun. 7, 2022

(54) SYSTEMS AND METHODS FOR SELECTING A CORE NETWORK SLICE FOR USER PLANE COMMUNICATIONS

(71) Applicant: Verizon Patent and Licensing Inc., Arlington, VA (US)

(72) Inventors: Ye Huang, San Ramon, CA (US); Miguel A. Carames, Long Valley, NJ (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 130 days.

(21) Appl. No.: 16/799,550

(22) Filed: Feb. 24, 2020

(65) Prior Publication Data

US 2021/0266780 A1    Aug. 26, 2021

(51) Int. Cl.
*H04W 28/02* (2009.01)
*H04W 60/00* (2009.01)
*H04W 76/10* (2018.01)

(52) U.S. Cl.
CPC ....... *H04W 28/0268* (2013.01); *H04W 60/00* (2013.01); *H04W 76/10* (2018.02)

(58) Field of Classification Search
None
See application file for complete search history.

(56) References Cited

U.S. PATENT DOCUMENTS

| 2018/0376384 | A1* | 12/2018 | Youn | H04W 36/0022 |
| 2019/0254083 | A1* | 8/2019 | Stammers | H04W 48/18 |
| 2019/0289650 | A1* | 9/2019 | Yoo | H04W 48/18 |

OTHER PUBLICATIONS

3GPP TR 21.905 V16.0.0 (Jun. 2019), "3rd Generation Partnership Project; Technical Specification Group Services and System Aspects; Vocabulary for 3GPP Specifications (Release 16)," Jun. 2019.
3GPP TS 38.413 V16.0.0 (Dec. 2019), "3rd Generation Partnership Project; Technical Specification Group Radio Access Network; NG-RAN; NG Application Protocol (NGAP) (Release 16)," Dec. 2019.
P. Sahu, "5G PDU Session Establishment," Oct. 2018 (available at http://5gblogs.com/5g-pdu-session-establishment/, accessed Feb. 24, 2020).

(Continued)

*Primary Examiner* — Kouroush Mohebbi

(57) ABSTRACT

Systems described herein provide techniques for establishing and modifying user plane communications sessions between Long-Term Evolution ("LTE") User Equipment ("UE") devices, connected to LTE base stations, and a Fifth Generation ("5G") core network. An LTE-5G Interworking function ("LTE-5G IWF") may logically generate a virtual 5G UE and/or 5G base station, map a LTE UE to the virtual 5G UE, and cause the establishment of a Protocol Data Unit ("PDU") Session, at the 5G core network, with the virtual 5G UE. The LTE-5G IWF may provide PDU Session information to the LTE UE and base station to facilitate the establishment of user plane communications (e.g., via a tunnel) between the LTE UE and the 5G core network. The LTE-5G IWF may also receive modification parameters, such as Quality of Service ("QoS") parameters, and provide instructions to the 5G core and/or to the LTE UE to handle traffic according to such parameters.

20 Claims, 12 Drawing Sheets

(56) References Cited

OTHER PUBLICATIONS

"gNB Interactions: 5G Standalone Access Registration," Feb. 2019 (available at https://www.eventhelix.com/5G/standalone-access-registration/gNB.pdf, accessed Feb. 24, 2020).
"LTE Attach and Default Bearer Setup," Mar. 2019 (available at https://www.eventhelix.com/lte/attach/lte-attach.pdf, accessed Feb. 24, 2020).
"UE Interactions: 5G Standalone Access Registration," Feb. 2019 (available at https://www.eventhelix.com/5G/standalone-access-registration/UE.pdf, accessed Feb. 24, 2020).
ETSI TS 123 501 V15.3.0 (Sep. 2018), "5G; System Architecture for the 5G System (3GPP TS 23.501 version 15.3.0 Release 15)," Sep. 2018.
ETSI TS 123 502 V15.2.0 (Jun. 2018), "5G; Procedures for the 5G System (3GPP TS 23.502 version 15.2.0 Release 15)," Jun. 2018.
"S1AP View of Inter MME S1 Handover in LTE" (available at https://www.eventhelix.com/lte/handover/s1/lte-inter-mme-s1-handover-s1ap-view.pdf, accessed Feb. 24, 2020).

\* cited by examiner

SYSTEMS AND METHODS FOR SELECTING A CORE NETWORK SLICE FOR USER PLANE COMMUNICATIONS

BACKGROUND

Wireless networks utilize different types of radio access networks ("RANs") and/or core networks. Fifth Generation ("5G") RANs may offer relatively low latency and/or high throughput services, but may not be as widely deployed as Long-Term Evolution ("LTE") RANs, which may be available or already installed in areas that do not have 5G coverage.

DETAILED DESCRIPTION OF THE PREFERRED EMBODIMENTS

The following detailed description refers to the accompanying drawings. The same reference numbers in different drawings may identify the same or similar elements.

Embodiments described herein provide for the establishment and modification of connections (e.g., user plane sessions) between User Equipment ("UE") communicating via a LTE radio access technology ("RAT") and a 5G core network. As discussed herein, a LTE-to-5G Interworking Function ("LTE-5G IWF") may be communicatively coupled to one or more devices or systems associated with an LTE network (e.g., one or more LTE base stations, which may take the form of evolved Node Bs ("eNBs") and/or one or more Mobility Management Entities ("MMEs")) and to one or more devices or systems associated with a 5G network (e.g., an Access and Mobility Function ("AMF")).

As described herein, the LTE-5G IWF may receive information regarding a LTE UE that has connected to a particular eNB (e.g., using an LTE RAT), and may simulate control plane signaling associated with establishing communications between the UE and an LTE core network. Further, the LTE-5G IWF may simulate, based on the eNB and the LTE UE, a 5G base station (e.g., a Next Generation Node B ("gNB")) and a 5G UE. As discussed herein, the simulated gNB and 5G UE may be referred to as a "virtual" gNB and a "virtual" 5G UE, or as a "vgNB" and a "vUE," respectively. The LTE-5G IWF may communicate control signaling with an AMF of a 5G core network to simulate the establishment of communications between the 5G core network and the vUE (e.g., as if the vUE were connected to the vgNB). By virtue of performing these control signaling processes with elements of the LTE network and the 5G network, each of these networks may maintain a context associated with a UE. That is, the LTE network may maintain context information associated with the LTE UE, and the 5G network may maintain context information associated with the vUE. As described herein, these "dual" contexts (i.e., as maintained by the LTE and 5G networks, respectively) may further be used to establish and/or modify one or more user plane data sessions between the LTE UE and a User Plane Function ("UPF") of the 5G network.

Figure 1:
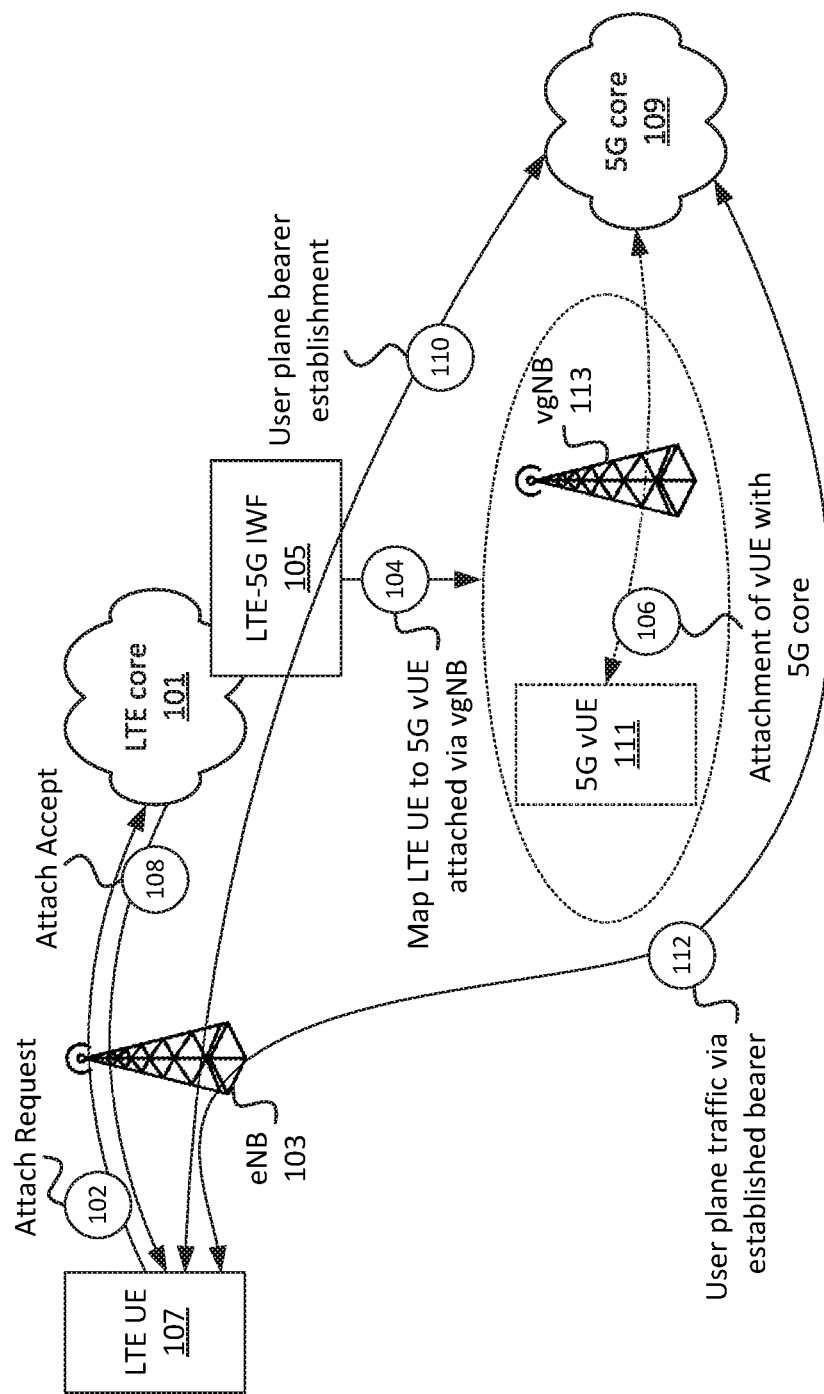
FIG. 1 illustrates an example overview of one or more embodiments described herein, in which a Long-Term Evolution ("LTE")-to-Fifth Generation ("5G") Interworking Function ("LTE-5G IWF") may operate to establish communications between a LTE User Equipment ("UE") and a 5G core network.

FIG. 1 provides an overview of some of the concepts discussed above. As shown in FIG. 1, for example, LTE core network 101 may receive (at 102) an Attach Request. For the sake of simplicity, the Attach Request is shown in this figure as originating from LTE UE 107. In practice, the Attach Request may be received from eNB 103, which may output the Attach Request based on a Radio Resource Configuration ("RRC") connection procedure performed between UE 101 and eNB 103. That is, once a radio frequency ("RF") connection has been established between UE 101 and eNB 103, eNB 103 may output the Attach Request, associated with UE 101, to one or more elements of LTE core 101. The Attach Request may be sent via an S1-C interface between eNB 103 and an MME of LTE core 101.

As shown in FIG. 1, LTE core 101 may include, and/or may be communicatively coupled to, LTE-5G IWF 105. For example, LTE-5G IWF 105 may be communicatively coupled with an MME of LTE core 101 (e.g., a particular MME that received the Attach Request from eNB 103), and may receive the Attach Request from the MME. Additionally, or alternatively, as discussed in further detail below, a first MME of LTE core 101 may receive the Attach Request, determine that LTE UE 107 and/or the Attach Request should be forwarded to a second MME and/or to LTE-5G IWF 105, and may accordingly forward the Attach Request to the second MME and/or to LTE-5G IWF 105.

The Attach Request may include information identifying LTE UE 107. Generally, the identifying information received in the Attach Request may include identifying information used by LTE networks to establish communications between LTE UEs and LTE RANs and/or a LTE core network. The identifying information received in the Attach Request may include, in some embodiments, International Mobile Subscriber Identity ("IMSI"), International Mobile Station Equipment Identity ("IMEI"), Globally Unique Temporary Identifier ("GUTI"), and/or identifying information of LTE UE 107. In some embodiments, the Attach Request may include one or more Packet Data Network ("PDN") identifiers, which may indicate a type of service or application that LTE UE 107 is requesting (e.g., voice, data, etc.).

Once LTE-5G IWF 105 receives the Attach Request, LTE-5G IWF 105 may generate a 5G context, for subsequent use by 5G core network 109, associated with LTE UE 107. For example, LTE-5G IWF 105 may map a first set of identifiers associated with LTE UE 107 (e.g., IMSI, IMEI, GUTI, PDN identifier, and/or one or more other identifiers) to a second set of identifiers. As discussed above, this first set of identifiers may have been received via the Attach Request, and may be associated with operations related to LTE networks. The second set of identifiers may be generated by LTE-5G IWF 105 and/or selected from a pool of available identifiers, and may be associated with operations related to 5G networks. The second set of identifiers may include, for example, a Subscription Concealed Identifier ("SUCI"), a Subscription Permanent Identifier ("SUPI"), a Permanent Equipment Identifier ("PEI"), Access Point Name ("APN"), and/or another identifier. In some embodiments, the second set of identifiers may include one or more cell or base stations identifiers associated with 5G networks, such as a New Radio ("NR") Cell Identity ("NCI"), NR Cell Global Identity ("NCGI"), and/or some other identifier associated with base stations (e.g., gNBs) associated with a 5G RAN.

In some embodiments, the second set of identifiers may be generated based on the first set of identifiers. For example, LTE-5G IWF 105 may generate one or more of the second set of identifiers by performing a hash or some other function based on one or more of the first set of identifiers. In some embodiments, the second set of identifiers may be generated or selected independent of the values of the first set of identifiers.

As mentioned above, the mapped identifiers (e.g., the second set of identifiers) may be associated with a "virtual" UE and gNB, conceptually shown in FIG. 1 as 5G vUE 111 and vgNB 113, and may be used to simulate the attachment of vUE 111 to 5G core network 109 via vgNB 113. LTE-5G IWF 105 may thus maintain a "dual context" associated with LTE UE 107. A first context may include information (such as the first set of identifiers) used to establish, maintain, modify, etc. communications between LTE UE 107 and LTE core network 101, and the second context may include information (such as the second set of identifiers) used to establish, maintain, modify, etc. communications between 5G vUE 111 and 5G core network 109. As described herein, these dual contexts may be used by LTE-5G IWF 105 to facilitate communications between LTE UE 107 and 5G core network 109.

For example, as described in greater detail below, LTE-5G IWF 105 may use one of these contexts (e.g., including the second set of identifiers) to simulate (at 106) the attachment of vUE 111 to 5G core network 109. The attachment procedure may be performed, for example, by way of communications between LTE-5G IWF 105 and an AMF of LTE-5G IWF 105. Thus, while conceptualized in the figure as being "performed by" 5G vUE 111 through vgNB 113, the actual signaling to simulate the attachment of 5G vUE 111 to 5G core network 109 may be performed by LTE-5G IWF 105.

Figure 2A:
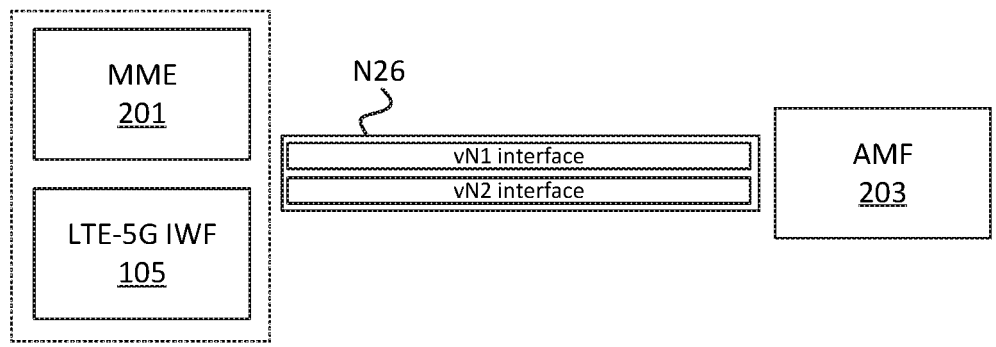
FIGS. 2A and 2B conceptually illustrate virtual 5G interfaces, which may be provided by the LTE-5G IWF of some embodiments.

For instance, as shown in FIG. 2A, LTE-5G IWF 105 and/or MME 201 (which may be associated with LTE core network 101) may communicate with AMF 203 (which may be associated with 5G core network 109) via an N26 interface. In some embodiments, LTE-5G IWF 105 may communicate with AMF 203 "directly" via the N26 interface. In some embodiments, LTE-5G IWF 105 may "indirectly" communicate with AMF 203 via the N26 interface by communicating with MME 201, which may in turn communicate with AMF 203 via the N26 interface. Similarly, AMF 203 may communicate with LTE-5G IWF 105 "directly" via the N26 interface, and/or "indirectly" by communicating messages, intended for LTE-5G IWF 105, to MME 201. For brevity, communications will be described herein as though LTE-5G IWF 105 and AMF 203 are "directly" connected via the N26 interface. In practice, such communications may be provided "indirectly" in a manner similar to that outlined above.

Via the interface between LTE-5G IWF 105 and AMF 203, "virtual" N1 and N2 interfaces (shown in the figure as "vN1" and "vN2") may be provided. For example, LTE-5G IWF 105 and AMF 203 may communicate, via N26 messages (e.g., in N26 "containers"), N1 and/or N2 messages (e.g., messages in N1 and/or N2 containers). That is, a "vN1" message may be passed by LTE-5G IWF 105 to AMF 203 (or vice versa) by providing the message in an N1 container that is contained within an N26 container. Similarly, a "vN2" message may be passed by LTE-5G IWF 105 to AMF 203 (or vice versa) by providing the message in an N2 container that is contained within an N26 container.

Figure 2B:
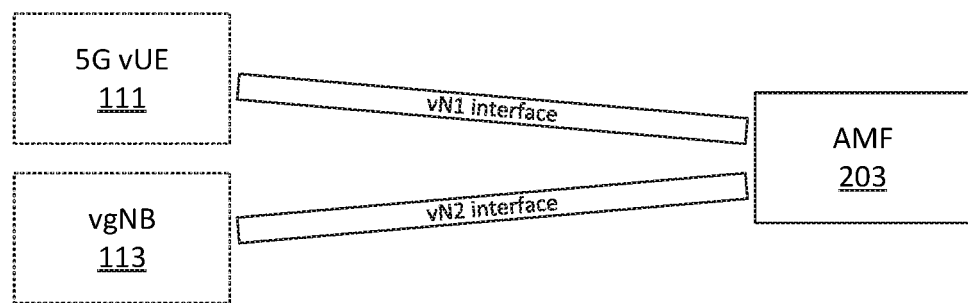

As shown in FIG. 2B, for example, the vN1 interface may be used to simulate messages between vUE 111 and AMF 203, and the vN2 interface may be used to simulate messages between vgNB 113 and AMF 203. Thus, a message sent by LTE-5G IWF 105 via the vN1 interface (e.g., in an N1 container) may be interpreted by AMF 203 as having been sent by vUE 111, while a message sent by LTE-5G IWF 105 via the vN2 interface (e.g., in an N2 container) may be interpreted by AMF 203 as having been sent by gNB 113.

Returning to FIG. 1, once the attachment of 5G vUE 111 to 5G core network 109 has been simulated, LTE-5G IWF 105 may perform (at 110) a user plane bearer establishment procedure. Briefly, this procedure may include establishing one or more bearers, sessions, tunnels (e.g., a General Packet Radio Service ("GPRS") Tunneling Protocol ("GTP") tunnel), etc. between eNB 103 and one or more devices or systems (e.g., a UPF) associated with 5G core network 109. Once established, eNB 103 and 5G core network 109 (e.g., a UPF of 5G core network 109) may be configured to communicate (at 112) user plane traffic, such as voice traffic, data traffic, etc., with each other. Further, by virtue of its attachment to eNB 103, LTE UE 107 may now be considered to be communicatively coupled to 5G core network 109, and may communicate with 5G core network 109 without using any different signaling than when LTE UE 107 is communicatively coupled to LTE core network 101.

Figure 3:
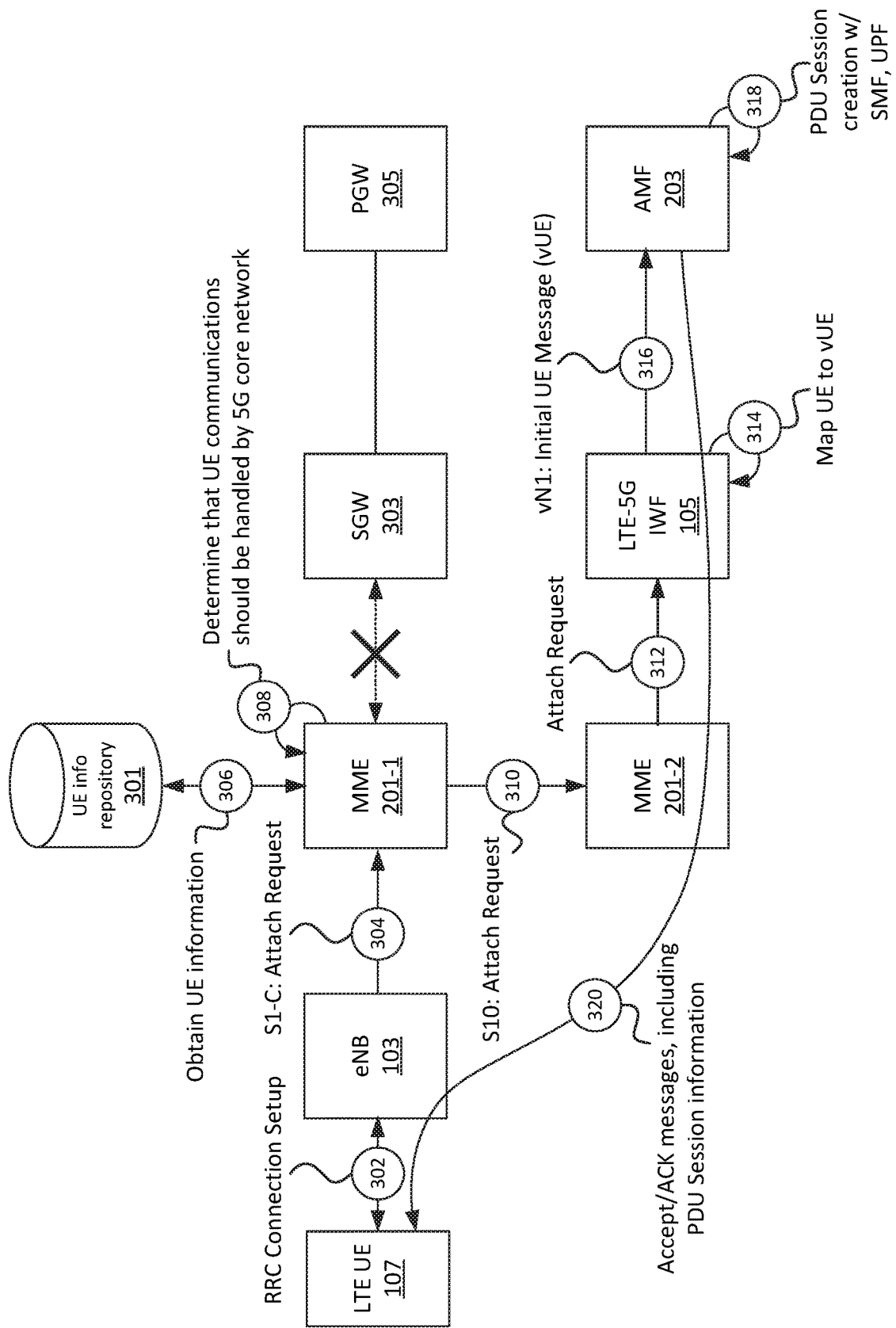
FIG. 3 illustrates example signaling, involving a LTE-5G IWF, to selectively establish communications between a LTE UE and a 5G core network, in accordance with some embodiments.

As referred to above, FIG. 3 illustrates example signaling, involving LTE-5G IWF 105, to selectively establish communications between LTE UE 107 and 5G core network 109, in accordance with some embodiments. As shown, LTE UE 107 and eNB 103 may perform (at 302) an RRC Connection Setup procedure. By way of this procedure, LTE UE 107 and eNB 103 may establish an RF connection, via which LTE UE 107 and eNB 103 may communicate wirelessly. As part of this procedure, eNB 103 may receive or determine one or more identifiers associated with LTE UE 107, such as IMSI, IMEI, GUTI, and/or some other suitable identifier of LTE UE 107. Further, as part of this procedure, eNB 103 may also identify one or more types of services or networks to which UE 107 is authorized to access, which may be indicated by one or more APNs. For example, one or more messages sent from UE 107 to eNB 103 as part of this procedure may indicate the one or more APNs. In some embodiments, different APNs may be associated with different services (e.g., one APN may be associated with voice call services, another APN may be associated with data services, etc.).

Once the RF connection between LTE UE 107 and eNB 103 has been established, eNB 103 may output (at 304) an Attach Request to MME 201-1 (where a single MME may be referred to herein as "MME 201," and where a collection of MMES may be referred to as "MMES 201"). The Attach Request may be provided via an S1 interface (e.g., an S1-C interface) between eNB 103 and MME 201-1. The attach request may include one or more of the identifiers associated with LTE UE 107. MME 201-1 may, in some embodiments, be an MME that is associated with a tracking area ("TA") with which LTE UE 107 and/or eNB 103 is associated, and/or may be an MME that otherwise receives the Attach Request.

As shown, MME 201-1 may not be communicatively coupled to LTE-5G IWF 105, while another MME (i.e., MME 201-2, in this example) is communicatively coupled to LTE-5G IWF 105. In some embodiments, MME 201-2 may be a "dedicated" or "designated" MME, which may be an MME that is used for signaling involving the interworking between the LTE RAN (e.g., eNB 103) and elements of 5G core network 109 (e.g., AMF 203). In other words, some MMES (e.g., "non-dedicated" MMES) may not have a communication pathway to LTE-5G IWF 105 (such as MME 201-1, in this figure), while some MMES may have a communication pathway to LTE-5G IWF 105 (such as MME 201-2). In such embodiments, MMEs and/or some other device or system of LTE core network 101 (such as a Home Subscriber Server ("HSS"), a Policy Charging and Rules Function ("PCRF"), a Domain Name System ("DNS") resolution device, and/or some other device of LTE core network 101) may maintain information indicating which MMEs are associated with (e.g., are communicatively coupled to) LTE-5G IWF 105, and/or which MMEs are not associated with LTE-5G IWF 105.

In some embodiments, a particular dedicated MME may be associated with a set of non-dedicated MMEs. In some such embodiments, a first non-dedicated MME associated with a first dedicated MME may thus communicate with the first dedicated MME, and a second non-dedicated MME associated with a second dedicated MME may communicate with the second dedicated MME. In some embodiments, as described below, different dedicated MMEs may be associated with different Quality of Service ("QoS") levels, service types (e.g., voice, data, etc.), subscriber types (e.g., enterprise subscribers, first responder subscribers, etc.), and/or other attributes. As described herein, these factors may additionally, or alternatively, be used to select a particular dedicated MME with which a non-dedicated MME should communicate.

In this example, for example, MME 201-1 may obtain (at 306) information regarding LTE UE 107. In some embodiments, the information may be obtained from UE information repository 301. UE information repository 301 may, in some embodiments, include a HSS or other device associated with LTE core network 101 that stores information regarding UEs and/or subscribers associated with UEs. In some embodiments, UE information repository 301 may be, or may include, some other device or system that is accessible via one or more networks that are "external" to LTE core network 101 (e.g., the Internet).

The UE information may include, for example, one or more QoS levels associated with LTE UE 107, such as a QoS Class Identifier ("QCI"). In some embodiments, multiple QoS levels may be specified for multiple different types of traffic or services. For example, for a given user, one QoS level or QCI may apply to voice traffic, while a different QoS level or QCI may apply to data traffic. As another example, one subscriber may be associated with a particular QoS level for voice traffic, while another subscriber may be associated with a different QoS level for voice traffic (i.e., the same type of traffic).

In some embodiments, the UE information may indicate a device type and/or hardware capabilities of LTE UE 107. For example, the UE information may indicate that LTE UE 107 is an Internet of Things ("IoT") device, that LTE UE 107 is a mobile telephone, that LTE UE 107 is a Mobile-to-Mobile ("M2M") device, etc. The UE information may indicate a screen size or resolution, processor speed or type, amount of memory, amount of storage space, and/or other attributes of LTE UE 107.

The UE information may further indicate one or more rules or combinations of different types of information. For example, LTE-5G IWF 105 may receive a particular rule from eNB 103, a PCRF associated with LTE core network 101, and/or some other device or system, indicating that UEs with a screen resolution or processor speed exceeding a threshold resolution or processor speed should be handled by 5G core network 109, while UEs with a screen resolution or processor speed not exceeding the threshold should be handled by LTE core network 101. As another example, LTE-5G IWF 105 may receive a particular rule indicating that particular traffic types (e.g., as indicated in the Attach Request received at 304) are associated with one QCI, while other traffic types are associated with a different QCI.

Further, as described below, LTE-5G IWF 105 may receive a particular rule indicating that traffic associated with different QCIs, subscribers of a certain type, UEs of a certain type, etc., should be handled by particular slices of 5G core network 109. For example, a rule may indicate that UE that is an M2M device should be handled by one slice of 5G core network 109, while a UE that is not an M2M device should be handled by a different slice of 5G core network 109. As referred to herein, 5G core network 109 may implement multiple "slices," where each slice includes an instance of 5G core network 109. Different slices of 5G core network 109 may be implemented by different and/or distinct hardware, cloud computing systems, Virtualized Network Functions ("VNFs"), etc. Different slices of 5G core network 109 may thus be accessible by different operators and/or network providers, while being inaccessible to others. Further, in some embodiments, different slices of 5G core network 109 may offer different services or differing levels of performance.

As further shown in FIG. 3, MME 201-1 may determine (at 308) that communications associated with LTE UE 107 should be handled by 5G core network 109. This determination may be based on, for example, information included in the Attach Request (at 304) and/or the UE information (at 306), as similarly described above by way of example. As denoted by the dashed line between MME 201-1 and Serving Gateway ("SGW") 303, MME 201-1 may determine (at 308) that the traffic associated with LTE UE 107 should be handled by 5G core network 109 in lieu of by LTE core network 101 (e.g., in lieu of elements of LTE core network 101, such as PDN Gateway ("PGW") 305, which may be communicatively coupled to SGW 303).

Based on this determination, MME 201-1 may forward (at 310) the Attach Request to MME 201-2. As similarly described above, MME 201-2 may be a "dedicated" MME, and may be selected or identified by MME 201-1 based on configuration information indicating that such requests should be forwarded to MME 201-2 (e.g., as opposed to some other dedicated MME). MME 201-1 may forward the Attach Request via an S10 interface between MME 201-1 and MME 201-2. The forwarded Attach Request (at 310) may include some or all of the information included in the Attach Request (at 304), including identifying information for LTE UE 107 and/or for eNB 103.

MME 201-2 may output (at 312) an Attach Request to LTE-5G IWF 105. In some embodiments, this Attach Request (output at 312) may include the Attach Request provided by eNB 103 (at 304) and/or by MME 201-1 (at 310), and/or may otherwise be based on the Attach Request provided by eNB 103 and/or MME 201-1. For example, the Attach Request (output at 312) may include identifying information for LTE UE 107 and/or for eNB 103.

LTE-5G IWF 105 may map (at 314) LTE UE 107 to a virtual UE (e.g., 5G vUE 111). For example, as similarly discussed above, LTE-5G IWF 105 may generate a set of identifiers associated with 5G vUE 111, and maintain information indicating that this set of identifiers is associated with LTE UE 107. This set of identifiers may include, for example, SUCI, SUPI, PEI, and/or some other identifier that may be used by AMF 203 and/or other elements of 5G core network 109 to identify or communicate with 5G vUE 111. In some embodiments, LTE-5G IWF 105 may generate these identifiers by performing a hash or some other function on one or more identifiers of LTE UE 107 (e.g., IMSI, IMEI, etc.). In some embodiments, LTE-5G IWF 105 may generate these identifiers in a manner independent of the identifiers of LTE UE 107 (e.g., using random and/or arbitrary identifiers). In some embodiments, LTE-5G IWF 105 may select these identifiers from a pool of available identifiers, and remove any identifiers from this pool when selecting them for 5G vUE 111 (e.g., mapping the selected identifiers to LTE UE 107).

In some embodiments, LTE-5G IWF 105 may also associate 5G vUE 111 with vgNB 113. That is, from the standpoint of 5G core network 109, 5G vUE 111 may be a wireless 5G UE that is wirelessly connected to vgNB 113. In actuality, and from the standpoint of LTE-5G IWF 105, 5G vUE 111 and vgNB 113 may be virtual devices with a logical association. LTE-5G IWF 105 may store or maintain this mapping for subsequent communications, such as signaling related to mobility or handovers of LTE UE 107 (e.g., from one eNB 103 to another).

LTE-5G IWF 105 may proceed to establish logical communications between AMF 203 and 5G vUE 111 (e.g., via a logical association between 5G vUE 111 and vgNB 113). For example, LTE-5G IWF 105 may output (at 316), via an N1 interface (e.g., a vN1 interface) between LTE-5G IWF 105 and AMF 203, an Initial UE Message. The Initial UE Message may include one or more of the identifiers for 5G vUE 111 generated or selected by LTE-5G IWF 105 (e.g., SUPI, SUCI, PEI, etc.). In some embodiments, the Initial UE Message may include one or more Protocol Data Unit ("PDU") Session IDs, which may be used to establish a PDU Session between 5G vUE 111 and the UPF of 5G core network 109, and/or AMF 203 may determine or generate one or more PDU Session IDs based on the Initial UE Message.

As described above, the N1 interface may be provided via a "virtual" N1 interface (e.g., "vN1") between LTE-5G IWF 105 and AMF 203. For example, LTE-5G IWF 105 may send the Initial UE Message to AMF 203 in an N1 container, via an N26 interface between LTE-5G IWF 105 and AMF 203. In some embodiments, although not explicitly shown here, LTE-5G IWF 105 may instruct MME 201-2 to send the Initial UE Message to AMF 203 via an N26 interface between MME 201-2 and AMF 203. For example, LTE-5G IWF 105 may provide the Initial UE Message to MME 201-2 in an N1 container, along with an instruction to provide the N1 container to AMF 203 via the N26 interface. Upon receiving the Initial UE Message, AMF 203 may perform (at 318) a PDU Session creation process, which may include communicating with one or more other elements of 5G core network 109, such as a Session Management Function ("SMF") and/or a UPF.

While not discussed in detail here, the PDU Session creation process may include the generation or selection of a Core Network ("CN") Tunnel identifier ("CN Tunnel ID"), as well as the generation or selection of an IP address (e.g., an IPv4 address, an IPv6 address, and/or a portion of an IPv6 address (e.g., an IPv6 prefix)) for 5G vUE 111. As described herein, this IP address may ultimately be used by a UPF of 5G core network 109 and LTE UE 107 to establish user plane communications between the UPF and LTE UE 107. As part of this PDU Session creation process, the generated CN Tunnel ID and IP address may be provided to AMF 203 (e.g., by the SMF via an N11 interface, and/or by the UPF via an N4 interface).

Once the PDU Session creation process is complete, AMF 203 may output (at 320) one or more Registration Accept messages to LTE-5G IWF 105, which may perform further signaling with MME 201, eNB 103, and/or LTE UE 107 to establish user plane communications (e.g., via a GTP tunnel between eNB 103 and the UPF), based on the generated IP address and the CN Tunnel ID.

For example, AMF 203 may output one or more Registration Accept messages in an N1 container and an N2 container (e.g., via the "virtual" N1 and N2, or "vN1" and "vN2," interfaces between AMF 203 and LTE-5G IWF 105) to LTE-5G IWF 105. The Registration Accept messages may include information generated or received by AMF 203 as part of the PDU Session creation process (at 318). Generally, the message sent via the vN1 interface may serve to logically associate 5G vUE 111 with the PDU Session, and the message sent via the vN2 interface may serve to logically associate vgNB 113 with the PDU Session.

Thus, from the standpoint of 5G core network 109, a PDU Session has been established between the UPF and 5G vUE 111, via vgNB 113. In some embodiments, LTE-5G IWF 105 may map the CN Tunnel ID to another type of identifier (e.g., a Tunnel Endpoint Identifier ("TEID")) for use by eNB 103 and/or LTE UE 107. In some embodiments, LTE-5G IWF 105 may provide (at 320) an Attach Accept message to MME 201-2 and/or to eNB 103 via an S1 interface (e.g., via an S1-C interface). Based on the information received in the Attach Accept message, eNB 103 may establish communications (e.g., an Evolved Packet System ("EPS") bearer)

with the UPF via a GTP Tunnel (established based on the provided CN Tunnel ID associated with the UPF and/or the TEID provided by LTE-5G IWF 105). The established communications (e.g., GTP tunnel carrying a PDU Session, EPS Bearer, etc.) between eNB 103 and the UPF may enable LTE UE 107 to communicate user plane traffic with the UPF.

In this manner, while LTE UE 107 maintains an RF connection with eNB 103 of an LTE RAN, the traffic may be handled by 5G core network 109 instead of by LTE core network 101. Handling the traffic by 5G core network 109 may aid in the transition of the utilization of 5G technologies as they become more prevalent. Additionally, 5G core network 109 may be capable of providing additional or enhanced services, as compared to LTE core network 101. Further, leveraging the continued use of currently deployed LTE architecture (e.g., existing LTE RANs, MMEs, etc.) in conjunction with elements of a 5G core network may facilitate the more rapid deployment of 5G technologies without requiring the decommissioning, removal, or non-utilization of existing LTE architecture.

Figure 4:
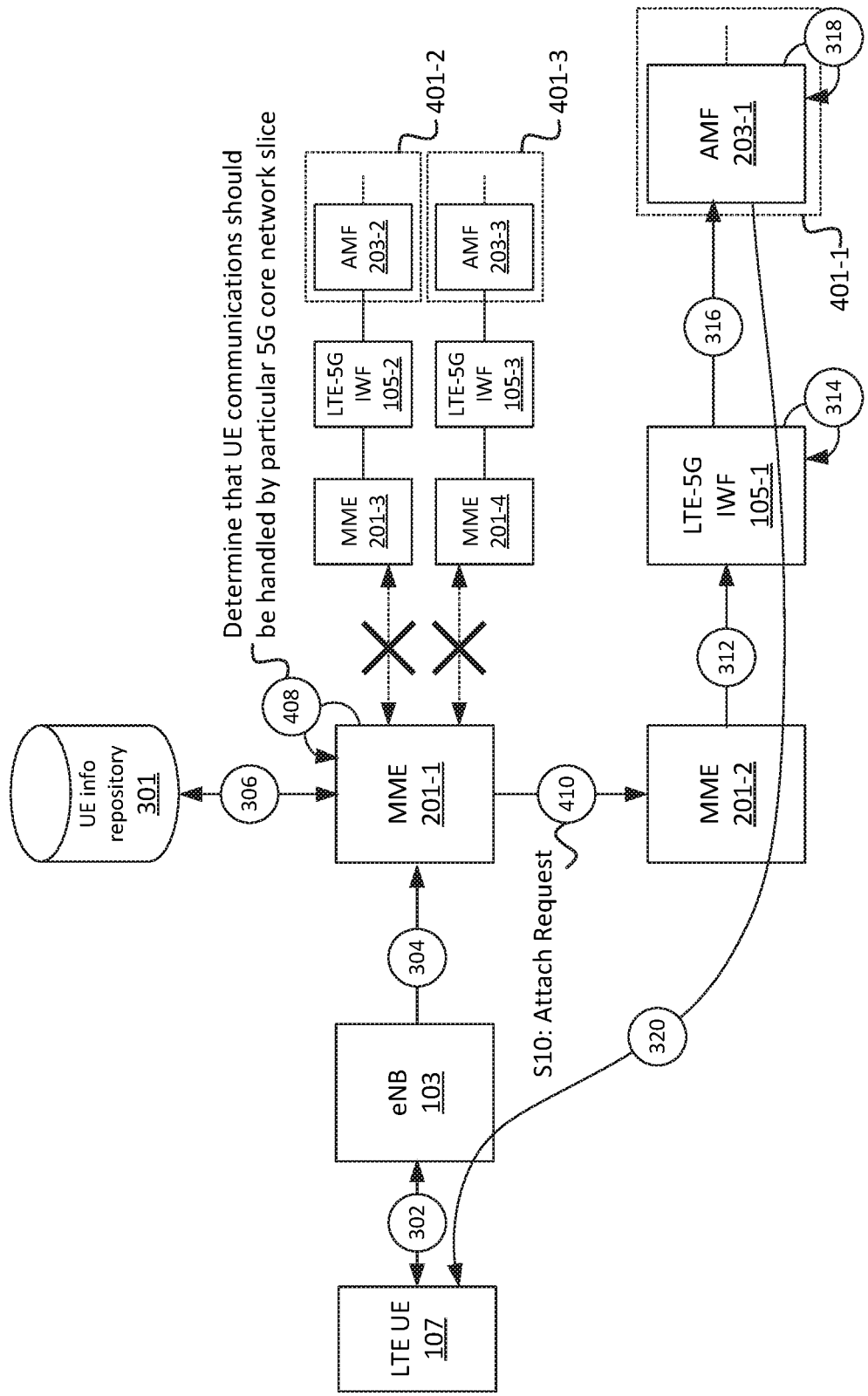
FIG. 4 illustrates example signaling, involving a LTE-5G IWF, to selectively establish communications between a LTE UE and a particular slice of a 5G core network, where different Mobility and Management Entities ("MMEs") are associated with different slices, in accordance with some embodiments.

FIG. 4 illustrates example signaling to selectively establish communications between LTE UE 107 and a particular slice of 5G core network 109, where different MMEs 201 are associated with different slices, in accordance with some embodiments. Some of the signals described in this figure are similar or identical to signals described above. These signals are denoted in this figure with the same reference numerals (e.g., 302, 304, etc.) as the reference numerals included in FIG. 3. For the sake of brevity, these signals are not described again in detail below.

As shown, for instance, LTE UE 107 and eNB 103 may perform (at 302) an RRC Connection Setup procedure, eNB 103 may output (at 304) an Attach Request to MME 201-1, and MME 201-1 may obtain (at 306) UE information and/or rules (e.g., from UE information repository 301, an HSS, a PCRF, and/or some other device or system).

Based on the received information, MME 201-1 may determine (at 408) that communications associated with LTE UE 107 should be handled by a particular slice of 5G core network 109. For example, as similarly discussed above, the Attach Request may include an identifier of LTE UE 107 (e.g., IMSI, IMEI, etc.), based on which information or attributes of LTE UE 107 may be identified. That is, MME 201-1 may use the identifying information of LTE UE 107 to identify which information, received (at 306) from UE information repository 301 is associated with LTE UE 107. As also mentioned above, the Attach Request may include additional information, based on which a particular slice of 5G core network 109 may be selected. For example, the Attach Request may indicate one or more traffic types, QCIs, and/or other information.

As one example, assume that the Attach Request (received at 304) indicates that LTE UE 107 is requesting voice call services. Further assume that the information (received at 306) indicates that voice call services are associated with a first QCI for a first set of subscribers, and that voice call services are associated with a second QCI for a second set of subscribers. In this example, MME 201-1 may use identifying information for LTE UE 107 to determine whether LTE UE 107 is in the first or the second set of subscribers, and may accordingly determine which QCI to apply to the requested voice call services for LTE UE 107. In this example, MME 201-1 may ultimately select a particular network slice 401 of 5G core network 109 based on the determined QCI. In other words, in some embodiments, certain QCIs (or other QoS levels) may correspond to certain network slices 401, while other QCIs (or other QoS levels) may correspond to different network slices 401.

While QoS level is discussed here as an example of a determining factor based on which a particular network slice 401 may be selected, in practice, different criteria may be used to select a particular network slice 401 to handle communications for LTE UE 107. For example, different slices may be associated with different sets of subscribers, device types, traffic types, etc.

In some embodiments, LTE-5G IWF 105 may select a network slice 401 based on one or more other factors. For example, LTE-5G IWF 105 may receive information regarding load and/or performance of each network slice 401 of a set of candidate slices, and may make the determination based on the load and/or performance of the candidate slices. The load and/or performance information may be received from a Network Exposure Function ("NEF") associated with each slice, and/or from some other suitable device or system that maintains information regarding the load and/or performance of each network slice 401 of the candidate set of slices. "Performance" may be expressed as, for example, measured throughput, latency, jitter, packet loss or error rate, and/or some other metric. The performance may be based on actual measurements performed by devices or systems that are in communication with the network slices 401, or by elements of the candidate slices themselves. "Load" may be expressed in terms of actual or theoretical capacity to handle traffic, such as a percentage or proportion of resources available for each slice 401, and/or an amount (e.g., throughput) of traffic handled by each slice 401 in a given time window.

In the example shown in FIG. 4, MME 201-1 has determined that the traffic for LTE UE 107 should be handled by slice 401-1, in lieu of slice 401-2 or slice 401-3. While not shown in this figure, MME 201-1 may have also determined that this traffic should be handled by slice 401-1 in lieu of by LTE core network 101 (e.g., by PGW 305). Further, in the example shown in this figure, each network slice is shown as including a particular AMF 203. For example, slice 401-1 includes AMF 203-1, slice 401-2 includes AMF 203-2, and slice 401-3 includes AMF 203-3. In practice, each slice 401 may include multiple devices or systems associated with a particular instance of 5G core network 109, but for the sake of simplicity, only AMFs 203 of each slice are shown here, and the dashed lines originating from AMFs 203 denote communication pathways or interfaces between each AMF 203 and other devices of each network slice. In this example, each slice 401 is also associated with a dedicated MME 201 and a particular LTE-5G IWF 105. For example, slice 401-1 is associated with MME 201-2 and LTE-5G IWF 105-1, slice 401-2 is associated with MME 201-3 and LTE-5G IWF 105-2, and slice 401-3 is associated with MME 201-4 and LTE-5G IWF 105-3.

As further shown, once MME 201-1 has selected the particular network slice (i.e., network slice 401-1 in this example), MME 201-1 may output (at 410) an Attach Request to the particular dedicated MME (i.e., MME 201-2) associated with the selected network slice 401-1. MME 201-2 may proceed to output (at 312) an Attach Request (e.g., based on the Attach Request received at 410) to LTE-5G IWF 105-1, which may map LTE UE 107 and/or eNB 103 to vUE 111 and/or vgNB 113, and may output (at 316) an Initial UE Message to AMF 203-1. AMF 203-1 and/or other elements of network slice 401-1 may establish (at 318) one or more user plane communication sessions (e.g., one or more GTP Tunnels carrying one or more PDU Sessions), and may output (at 320) one or more messages to enable user plane communications between LTE UE 107 and slice 401-1 (e.g., a UPF of slice 401-1), in a manner similar to that described above.

Figure 5:
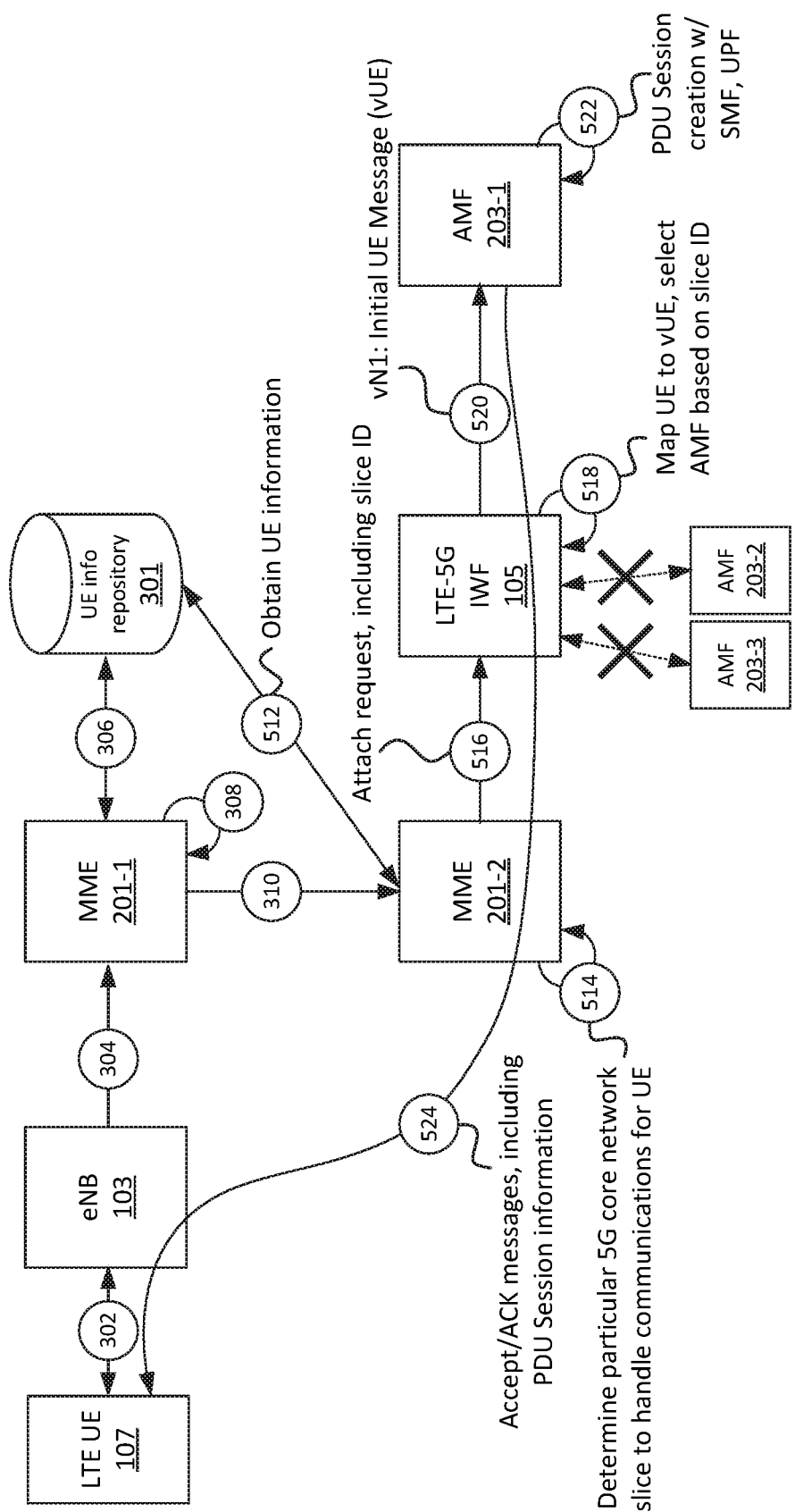
FIG. 5 illustrates example signaling, in which a LTE-5G IWF may selectively establish communications between a LTE UE and a particular slice of a 5G core network, where certain MMEs may be communicatively coupled to the LTE-5G IWF, in accordance with some embodiments.

FIG. 5 illustrates example signaling in accordance with some embodiments, in which a designated MME 201-2 may select a network slice to handle communications associated with LTE UE 107, and may indicate the selection to a particular LTE-5G IWF 105 that is communicatively coupled to multiple slices of 5G core network 109. For example, some embodiments may include one or more LTE-5G IWFs 105 that are communicatively coupled to multiple network slices of 5G core network 109. In this example, for example, LTE-5G IWF 105 is communicatively coupled to AMFs 203-1, 203-2, and 203-3, which may each be associated with a different network slice.

As shown, LTE UE 107 and eNB 103 may perform (at 302) an RRC Connection Setup procedure, eNB 103 may output (at 304) an Attach Request to MME 201-1, and MME 201-1 may obtain (at 306) UE information and/or rules (e.g., from UE information repository 301, an HSS, a PCRF, and/or some other device or system). MME 201-1 may determine (at 308) that user plane communications should be handled by 5G core network 109 (e.g., in lieu of LTE core network 101). Accordingly, MME 201-1 may forward (at 310) the Attach Request to MME 201-2 (e.g., via an S10 interface).

Once MME 201-2 receives (at 310) the Attach Request, MME 201-2 may obtain (at 512) UE information (e.g., from UE information repository 301, an HSS, a PCRF, etc., as similarly described above). Based on the obtained information, rules, etc., MME 201-2 may determine (at 514) a particular slice of 5G core network 109 to handle the communications associated with LTE UE 107. For example, as similarly described above, this determination may be made based on QoS information associated with the requested traffic and/or a subscriber associated with LTE UE 107, a traffic type of the requested traffic, a device type of LTE UE 107, performance or load of one or more network slices, etc.

MME 201-2 may accordingly output (at 516) an Attach Request to LTE-5G IWF 105. As similarly described above, the Attach Request (output at 516) may include some or all of the information included in the Attach Request received (at 310) from MME 201-1. MME 201-2 may also output (at 516) an indication of the selected slice. For example, MME 201-2 may include an identifier of the slice, such as a Single Network Slice Selection Assistance Information ("S-NS-SAI") value or some other suitable identifier.

LTE-5G IWF 105 may accordingly map (at 518) LTE UE 107 and/or eNB 103 to vUE 111 and/or vgNB 113, and may output (at 520) an Initial UE Message to AMF 203-1 of the selected slice. That is, LTE-5G IWF 105 may, based on the slice identifier (provided at 516), output the message to AMF 203-1, in lieu of to AMF 203-2 or AMF 203-3 of non-selected network slices. AMF 203-1 and one or more other devices of the selected slice may perform (at 522) a user plane communication setup procedure (as similarly described above), and may output (at 524) one or more messages to facilitate the establishment of user plane communications between the selected slice of 5G core network 109 and LTE UE 107, via eNB 103.

Figure 6:
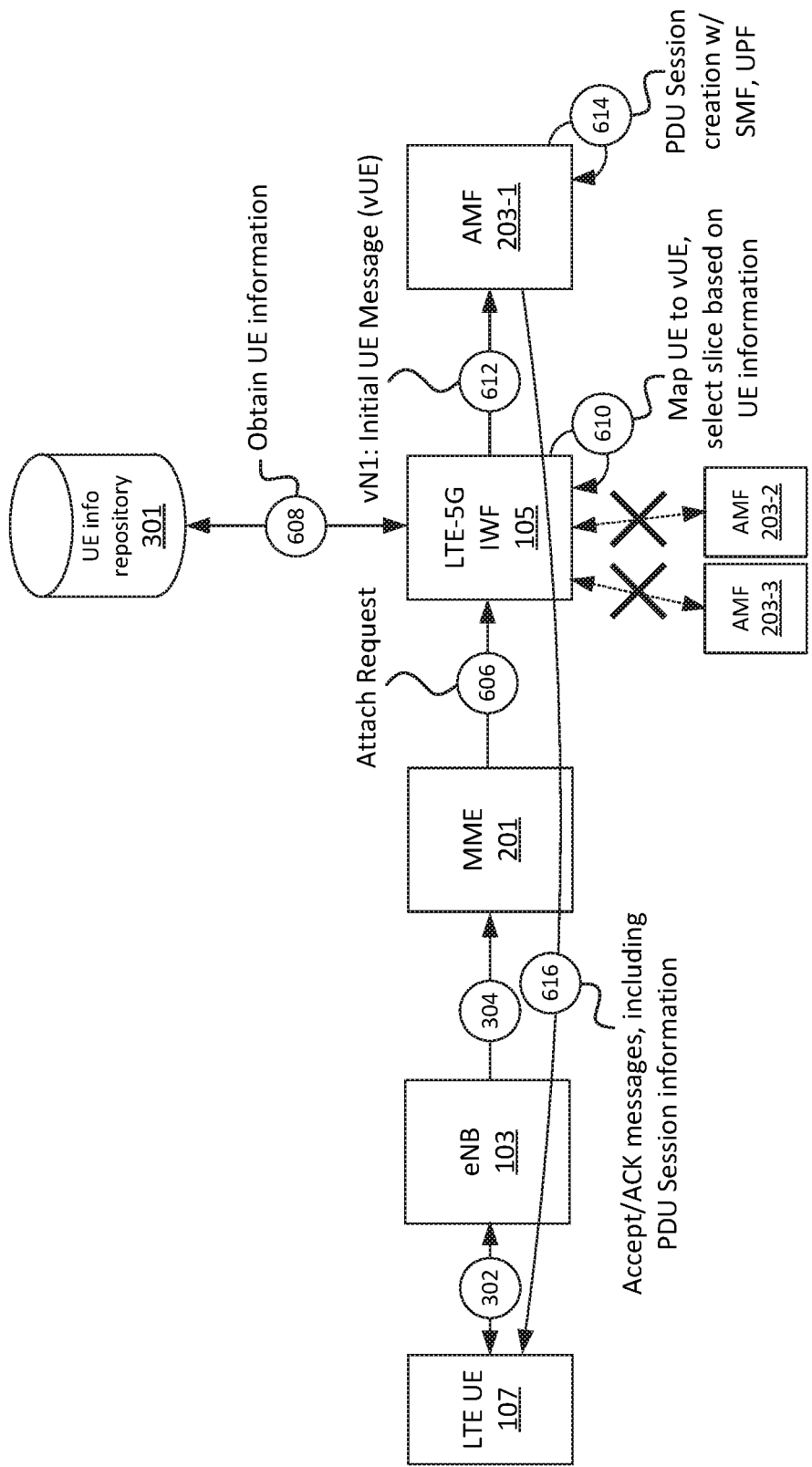
FIG. 6 illustrates example signaling, in which a LTE-5G IWF may selectively establish communications between a LTE UE and a particular slice of a 5G core network, in accordance with some embodiments.

FIG. 6 illustrates example signaling, in which a particular MME 201, which is communicatively coupled to LTE-5G IWF 105, receives the initial Attach Request from eNB 103, and in which LTE-5G IWF 105 selects a particular slice of 5G core network 109 to handle user plane communications associated with LTE UE 107. For example, in this example, MME 201 may be a "dedicated" MME, and/or an MME that is otherwise communicatively coupled to LTE-5G IWF 105.

As shown, LTE UE 107 and eNB 103 may perform (at 302) an RRC Connection Setup procedure, and eNB 103 may output (at 304) an Attach Request to MME 201. As mentioned above, MME 201 may be an MME that is communicatively coupled to, and/or is otherwise configured to communicate with, LTE-5G IWF 105. MME 201 may output (at 606) an Attach Request to LTE-5G IWF 105, which may include some or all of the information included in the Attach Request received (at 304) from eNB 103. LTE-5G IWF 105 may obtain (at 608) UE information. The information may be obtained from UE information repository 301, an HSS, a PCRF, and/or some other device or system that provides information that may be used to select a slice of 5G core network 109 to handle communications associated with LTE UE 107.

LTE-5G IWF 105 may map (at 610) LTE UE 107 to vUE 111 and/or may map eNB 103 to vgNB 113, and may select a network slice of 5G core network 109 based on the UE information (obtained at 608) and/or based on one or more other factors. Further, LTE-5G IWF 105 may output (at 612) an Initial UE Message to AMF 203-1 of the selected slice. That is, LTE-5G IWF 105 may output the message to AMF 203-1, in lieu of to AMF 203-2 or AMF 203-3 of non-selected network slices. AMF 203-1 and one or more other devices of the selected slice may perform (at 614) a user plane communication setup procedure (as similarly described above), and may output (at 616) one or more messages to facilitate the establishment of user plane communications between the selected slice of 5G core network 109 and LTE UE 107, via eNB 103.

Figure 7:
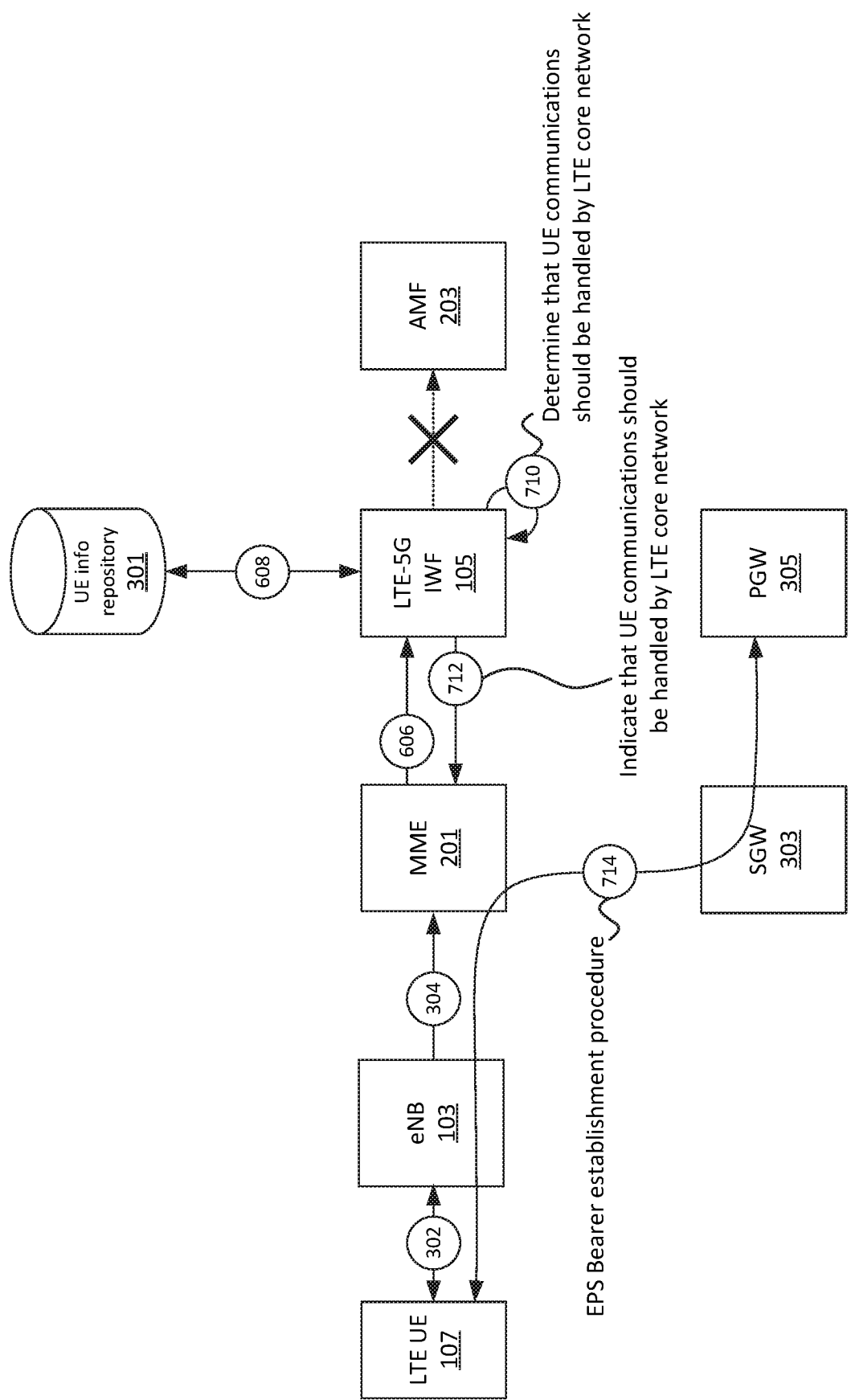
FIG. 7 illustrates example signaling, in which a LTE-5G IWF may selectively establish communications between a LTE UE and a LTE core network, in accordance with some embodiments.

FIG. 7 illustrates example signaling, in which LTE-5G IWF 105 may selectively establish communications between LTE UE 107 and LTE core network 101, in accordance with some embodiments. For example, MME 201 may output an Attach Request to LTE-5G IWF 105, which may reject the request and/or otherwise indicate that user plane communications for LTE UE 107 should not be handled by 5G core network 109.

As shown, LTE UE 107 and eNB 103 may perform (at 302) an RRC Connection Setup procedure, eNB 103 may output (at 304) an Attach Request to MME 201, MME 201 may output (at 606) an Attach Request to LTE-5G IWF 105, and LTE-5G IWF 105 may obtain (at 608) UE information.

In this scenario, LTE-5G IWF 105 may determine (at 710) that communications associated with LTE UE 107 should be handled by LTE core network 101, and/or should not be handled by 5G core network 109. For example, LTE-5G IWF 105 may receive information indicating that 5G core network 109 is overloaded, or that performance metrics associated with 5G core network 109 do not meet QoS levels associated with LTE UE 107 or with a requested type of traffic associated with LTE UE 107. As another example, LTE-5G IWF 105 may determine (e.g., based on the UE information) that a subscription associated with UE 107 does not meet criteria or requirements for having traffic handled by 5G core network 109. As yet another example, LTE-5G IWF 105 may determine that a device type or attributes of LTE UE 107 do not meet criteria or requirements for having traffic handled by 5G core network 109 (e.g., LTE UE 107 may have a processor that operates at less than a threshold speed, less than a threshold amount of memory, etc.). In some embodiments, LTE-5G IWF 105 may utilize other factors or criteria to determine that traffic associated with LTE UE 107 should be handled by LTE core network 101, as opposed to by 5G core network 109 (e.g., by AMF 203).

Based on this determination, LTE-5G IWF 105 may output (at 712) an indication to MME 201 that communications associated with LTE UE 107 should be handled by LTE core network 101. Accordingly, MME 201, SGW 303, PGW 305, eNB 103, LTE UE 107, and/or one or more other devices or systems may perform (at 714) an EPS Bearer Establishment procedure, in order to establish user plane communications (e.g., a GTP Tunnel carrying one or more EPS Bearers) between LTE UE 107 and PGW 305 of LTE core network 101.

While described here in the context of an MME that receives (at 304) an Attach Request and outputs (at 606) an Attach Request to LTE-5G IWF 105, similar concepts from this figure apply to other arrangements discussed in other figures. For example, in arrangements where the Attach Request is received from eNB by a non-dedicated MME and then forwarded to a dedicated MME, the dedicated MME and/or a connected LTE-5G IWF 105 may indicate, to the non-dedicated MME, that user plane communications should be handled by LTE core network 101 (in lieu of by 5G core network 109). As another example, prior to outputting (at 606) the Attach Request to LTE-5G IWF 105, MME 201 may obtain UE information, rules, etc., and may make a determination of whether to request user plane connectivity from LTE-5G IWF 105 or to forgo requesting user plane connectivity from LTE-5G IWF 105 (and, instead, perform (at 714) the EPS Bearer establishment procedure).

Additionally, while described here as an indication (at 712) that communications should be handled by LTE core network 101, the indication may instead indicate that a request for a particular network slice is denied, and/or may include an indication of an alternate network slice. If one of these indications is received, MME 201 and/or LTE-5G IWF 105 may attempt to facilitate establishment of user plane connections with another slice of 5G core network 109 (e.g., a different slice than was denied).

Figure 8:
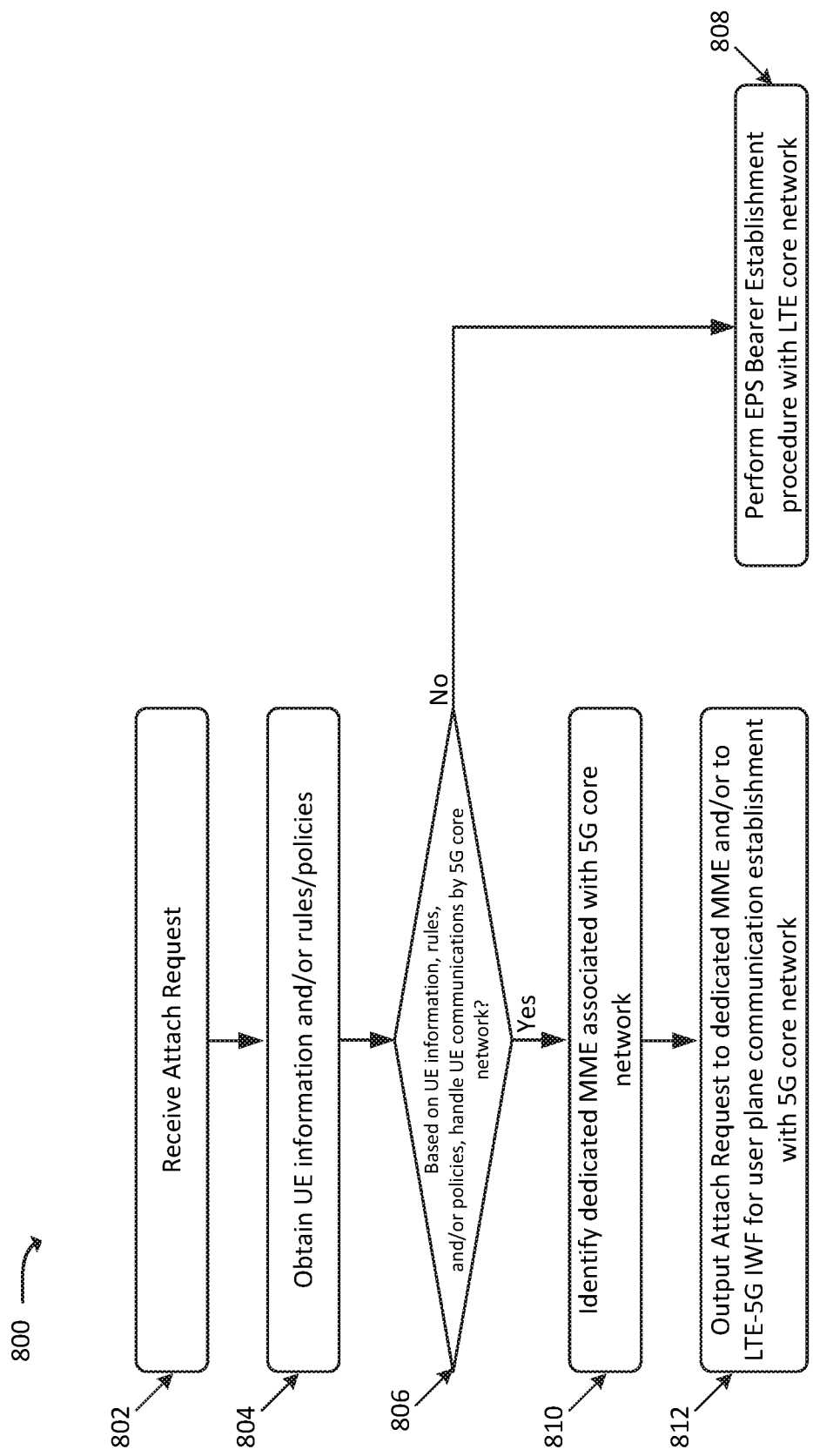
FIG. 8 illustrates an example process for selectively establishing user plane communications between a LTE UE and either an LTE core network or a 5G core network, in accordance with some embodiments.

FIG. 8 illustrates an example process 800 for selectively establishing user plane communications between LTE UE 107 and either LTE core network 101 or 5G core network 109. In some embodiments, some or all of process 800 may be performed by MME 201. For example, in some embodiments, some or all of process 800 may be performed by a dedicated MME 201 (e.g., which is communicatively coupled to LTE-5G IWF 105). In some embodiments, some or all of process 800 may be performed by a non-dedicated MME 201 (e.g., which is not communicatively coupled to LTE-5G IWF 105). In some embodiments, one or more other devices may perform some or all of process 800 (e.g., in concert with, and/or in lieu of, MME 201).

As shown, process 800 may include receiving (at 802) an Attach Request. For example, as discussed above, MME 201 may receive the Attach Request from eNB 103, based on a connection of LTE UE 107 to eNB 103. In some embodiments, this Attach Request may be received via an S1-C interface between eNB 103 and MME 201. Additionally, or alternatively, MME 201 may be a dedicated MME that receives the Attach Request from a non-dedicated MME (e.g., via an S10 interface between the dedicated and non-dedicated MMEs).

Process 800 may further include obtaining (at 804) UE information, rules, and/or policies. For example, as similarly discussed above, MME 201 may obtain information regarding LTE UE 107 and/or a subscriber associated with LTE UE 107 from eNB 103, an HSS, a PCRF, etc. The obtained information may, additionally, or alternatively, include network load and/or performance information, such as load and/or performance metrics associated with LTE core network 101, 5G core network 109, and/or with particular slices of 5G core network 109.

Process 800 may additionally include determining (at 806), based on the UE information, rules, and/or policies, whether user plane communications associated with LTE UE 107 should be handled by 5G core network 109. For example, as similarly discussed above, MME 201 may determine, based on one or more factors associated with the received information, rules, and/or policies, whether user plane communications associated with LTE UE 107 should be handled by 5G core network 109 or by LTE core network 101.

If it is determined that user plane communications associated with LTE UE 107 should not be handled by 5G core network 109, and/or should be handled by LTE core network 101 (at 806—NO), then process 800 may include performing (at 808) an EPS Bearer Establishment procedure with LTE core network 101. For example, MME 201, SGW 303, PGW 305, LTE UE 107, and/or eNB 103 may perform the EPS Bearer Establishment procedure to establish one or more user plane communication sessions (e.g., a GTP tunnel carrying one or more EPS Bearers) between LTE UE 107 and one or more elements of LTE core network 101, such as PGW 305.

If, on the other hand, it is determined that user plane communications associated with LTE UE 107 should be handled by 5G core network 109, (at 806—YES), then process 800 may further include identifying (at 810) a dedicated MME associated with 5G core network 109. For example, as similarly described above, MME 201 may be a non-dedicated MME. In such scenarios, when MME 201 determines that user plane communications associated with LTE UE 107 should be handled by 5G core network 109, MME 201 may identify and communicate with a dedicated MME that is communicatively coupled to LTE-5G IWF 105.

Process 800 may additionally include outputting (at 812) an Attach Request to the dedicated MME and/or to LTE-5G IWF 105, to facilitate user plane communication establishment with 5G core network 109. For example, if MME 201 is a non-dedicated MME, MME 201 may output the Attach Request to a dedicated MME via an S10 interface, which may provide the Attach Request to LTE-5G IWF 105 (as similarly discussed above). If MME 201 is a dedicated MME, MME 201 may output the Attach Request to LTE-5G IWF 105. As discussed above, LTE-5G IWF 105 may communicate with one or more elements of 5G core network 109 (e.g., AMF 203, which may in turn communicate with one or more other elements of 5G core network 109, such as an SMF, a UPF, etc.) to establish one or more GTP tunnels, PDU Sessions, etc. to carry user plane communications between LTE UE 107 and 5G core network 109.

Figure 9:
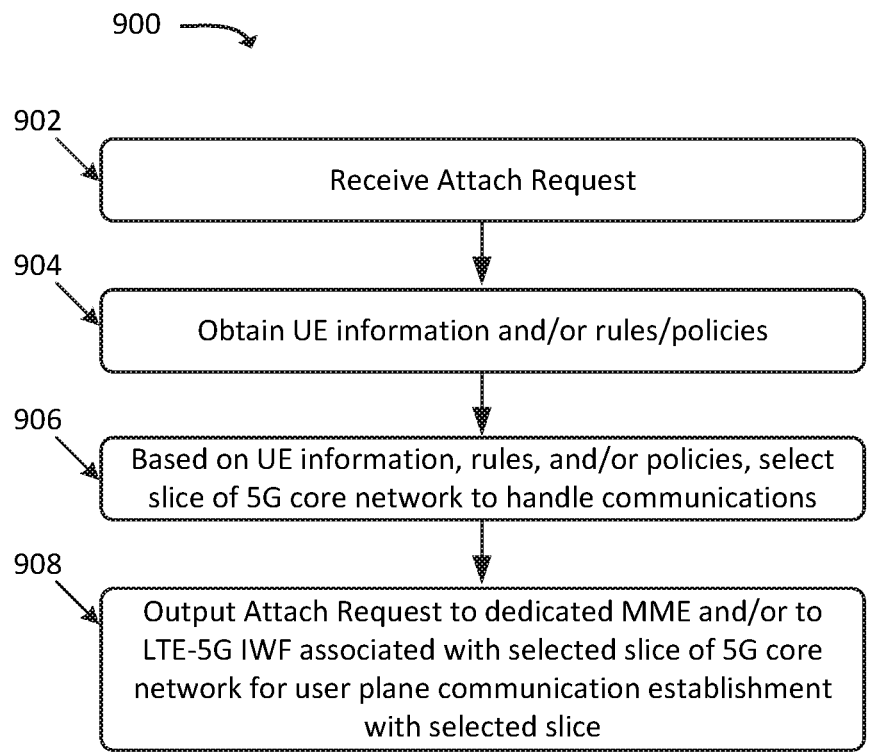
FIGS. 9 and 10 illustrate example processes for selecting a particular slice of a 5G core network to handle user plane communications associated with a LTE UE, in accordance with some embodiments.

FIG. 9 illustrates an example process 900 for selecting a particular slice of 5G core network 109 to handle user plane communications associated with LTE UE 107. In some embodiments, some or all of process 900 may be performed by MME 201. For example, in some embodiments, some or all of process 900 may be performed by a dedicated MME 201 (e.g., which is communicatively coupled to LTE-5G IWF 105). In some embodiments, some or all of process 900 may be performed by a non-dedicated MME 201 (e.g., which is not communicatively coupled to LTE-5G IWF 105). In some embodiments, one or more other devices may perform some or all of process 900 (e.g., in concert with, and/or in lieu of, MME 201).

As shown, process 900 may include receiving (at 902) an Attach Request. For example, as discussed above, MME 201 may receive the Attach Request from eNB 103, based on a connection of LTE UE 107 to eNB 103 (e.g., via an S1-C interface). Additionally, or alternatively, MME 201 may be a dedicated MME that receives the Attach Request from a non-dedicated MME (e.g., via an S10 interface).

Process 900 may further include obtaining (at 904) UE information, rules, and/or policies. For example, as similarly discussed above, MME 201 may obtain information regarding LTE UE 107 and/or a subscriber associated with LTE UE 107 from eNB 103, an HSS, a PCRF, etc. The obtained information may, additionally, or alternatively, include network load and/or performance information, such as load and/or performance metrics associated with particular slices of 5G core network 109.

Process 900 may additionally include selecting (at 906) a particular slice of 5G core network 109 to handle user plane communications associated with LTE UE 107. For example, MME 201 may select the particular slice based on QoS levels associated with LTE UE 107, a subscriber associated with LTE UE 107, a type of traffic or service indicated in the Attach Request, and/or other factors (e.g., as described above).

Process 900 may also include outputting (at 908) an Attach Request to the dedicated MME and/or to LTE-5G IWF 105, to facilitate user plane communication establishment with 5G core network 109. For example, if MME 201 is a non-dedicated MME, MME 201 may output the Attach Request to a dedicated MME via an S10 interface, which may provide the Attach Request to LTE-5G IWF 105 (as similarly discussed above). If MME 201 is a dedicated MME, MME 201 may output the Attach Request to LTE-5G IWF 105. As discussed above, LTE-5G IWF 105 may communicate with one or more elements of 5G core network 109 (e.g., AMF 203, which may in turn communicate with one or more other elements of 5G core network 109, such as an SMF, a UPF, etc.) to establish one or more GTP tunnels, PDU Sessions, etc. to carry user plane communications between LTE UE 107 and 5G core network 109.

Figure 10:
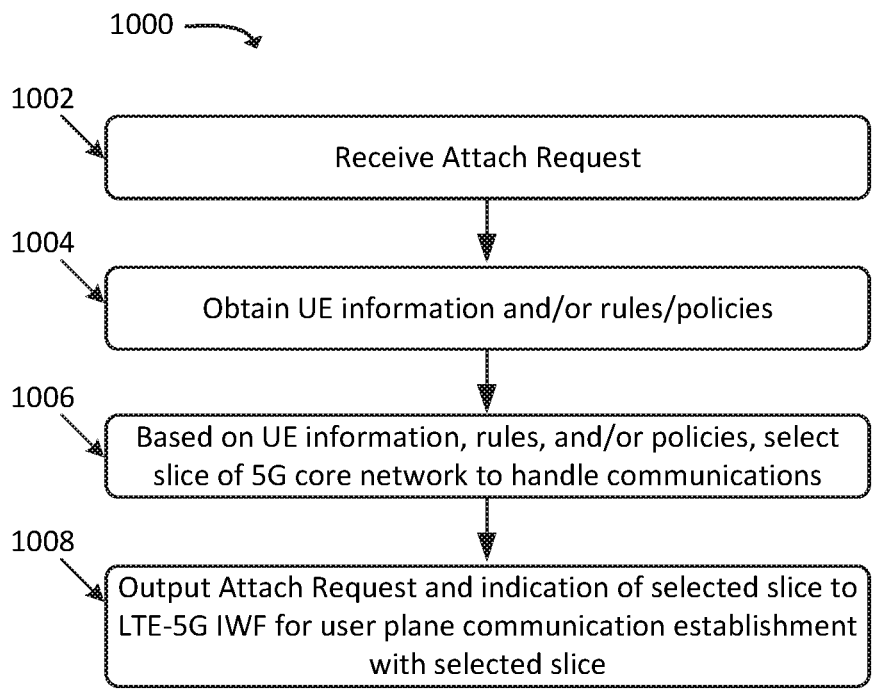

FIG. 10 illustrates an example process 1000 for selecting a particular slice of 5G core network 109 to handle user plane communications associated with LTE UE 107. In some embodiments, some or all of process 900 may be performed by MME 201 (e.g., a dedicated MME that is communicatively coupled to LTE-5G IWF 105). In some embodiments, one or more other devices may perform some or all of process 1000 (e.g., in concert with, and/or in lieu of, MME 201).

As shown, process 1000 may include receiving (at 1002) an Attach Request. For example, MME 201 may be a dedicated MME that receives the Attach Request from a non-dedicated MME via an S10 interface that is provided between MME 201 and the non-dedicated MME. Additionally, or alternatively, MME 201 may received the Attach Request from eNB 103 (e.g., via an S1-C interface).

Process 1000 may further include obtaining (at 1004) UE information, rules, and/or policies. For example, as similarly discussed above, MME 201 may obtain information regarding LTE UE 107 and/or a subscriber associated with LTE UE 107 from eNB 103, an HSS, a PCRF, etc. The obtained information may, additionally, or alternatively, include network load and/or performance information, such as load and/or performance metrics associated with particular slices of 5G core network 109.

Process 1000 may additionally include selecting (at 1006) a particular slice of 5G core network 109 to handle user plane communications associated with LTE UE 107. For example, MME 201 may select the particular slice based on QoS levels associated with LTE UE 107, a subscriber associated with LTE UE 107, a type of traffic or service indicated in the Attach Request, and/or other factors (e.g., as described above).

Process 1000 may also include outputting (at 1008) an Attach Request to LTE-5G IWF 105, to facilitate user plane communication establishment with 5G core network 109. As discussed above, LTE-5G IWF 105 may communicate with one or more elements of 5G core network 109 (e.g., AMF 203, which may in turn communicate with one or more other elements of 5G core network 109, such as an SMF, a UPF, etc.) to establish one or more GTP tunnels, PDU Sessions, etc. to carry user plane communications between LTE UE 107 and 5G core network 109.

Figure 11:
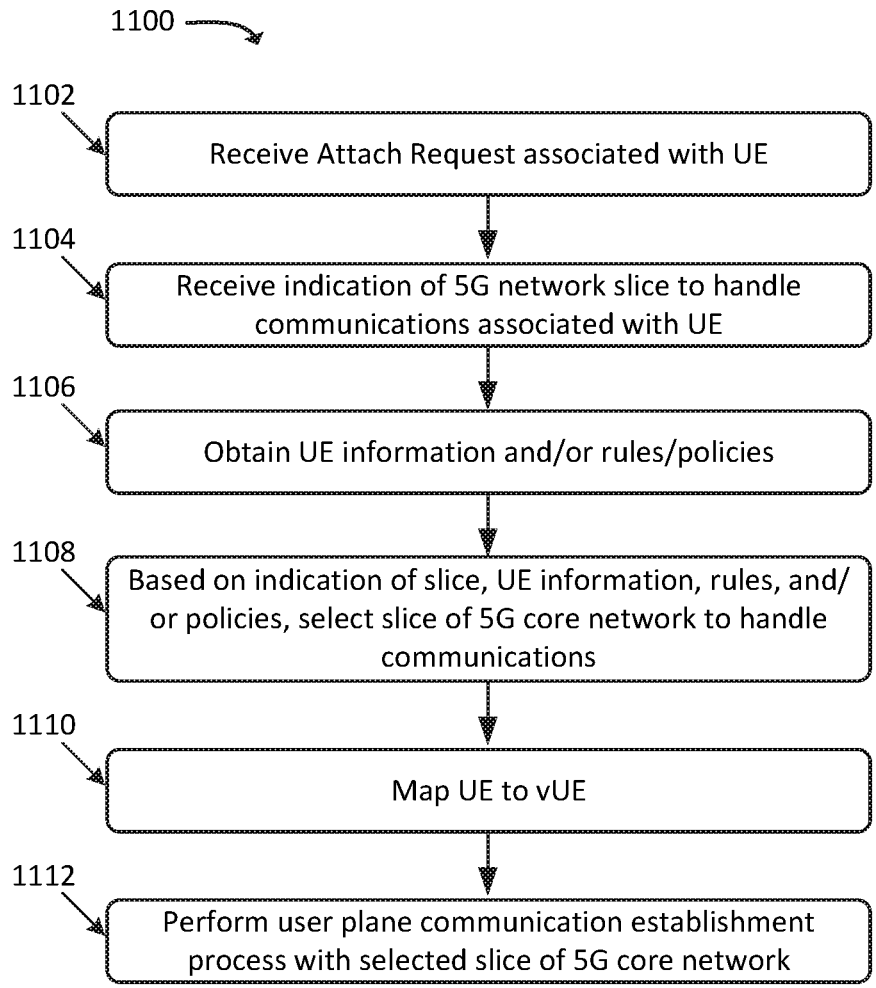
FIG. 11 illustrates an example process for establishing user plane communications between a LTE UE and a particular slice of a 5G core network, in accordance with some embodiments.

FIG. 11 illustrates an example process 1100 for $desc11. In some embodiments, some or all of process 1100 may be performed by LTE-5G IWF 105. In some embodiments, one or more other devices may perform some or all of process 1100 (e.g., in concert with, and/or in lieu of, LTE-5G IWF 105).

As shown, process 1100 may include receiving (at 1102) an Attach Request associated with a UE (e.g., with LTE UE 107). For example, LTE-5G IWF 105 may receive the Attach Request from MME 201 (e.g., a dedicated MME), which may have received the Attach Request from a non-dedicated MME and/or from eNB 103.

Process 1100 may further include receiving (at 1104) an indication of a network slice to handle user plane communications associated with the UE. For example, LTE-5G IWF 105 may receive a S-NSSAI value in conjunction with the Attach Request. As discussed above, MME 201 may have determined the particular network slice of 5G core network 109 based on UE information and/or other factors, and may provide the indication to LTE-5G IWF 105.

Process 1100 may additionally include obtaining (at 1106) UE information, rules, and/or policies. For example, as similarly discussed above, LTE-5G IWF 105 may obtain information regarding LTE UE 107 and/or a subscriber associated with LTE UE 107 from eNB 103, an HSS, a PCRF, etc. The obtained information may, additionally, or alternatively, include network load and/or performance information, such as load and/or performance metrics associated with particular slices of 5G core network 109.

Process 1100 may also include selecting (at 1108) a particular slice of 5G core network 109 to handle user plane communications associated with LTE UE 107. For example, LTE-5G IWF 105 may select the particular slice based on the indication of the slice (received at 1104). In some embodiments, LTE-5G IWF 105 may use the indication of the received slice as a factor in selecting a slice, but the indication of the received slice may not be a controlling factor in such embodiments. For example, LTE-5G IWF 105 may, in some embodiments, select the slice of 5G core network 109 based on the indication of the slice (received at 1104), as well as based on UE information, rules, and/or policies (obtained at 1106). In some embodiments, LTE-5G IWF 105 may not receive (at 1104) the indication of a particular slice, and/or may not use the indication of the slice when selecting the slice (e.g., may select the slice based on UE information, rules, and/or policies, but not based on a received indication of a particular slice).

Process 1100 may further include mapping (at 1110) LTE UE 107 to vUE 111. For example, as discussed above, LTE-5G IWF 105 may logically associate LTE UE 107 with 5G vUE 111, and may further maintain information indicating that 5G vUE 111 is logically connected to vgNB 113.

Process 11000 may also include performing (at 1112) a user plane communication establishment process with 5G core network 109. For example, LTE-5G IWF 105 may communicate with AMF 203 of 5G core network 109, which may communicate with other elements of 5G core network 109 (e.g., a SMF, a UPF, etc.) to establish one or more PDU Sessions, GTP tunnels, or the like. As discussed above, as part of this process, LTE-5G IWF 105 may map 5G GTP tunnel identifiers (e.g., CN Tunnel IDs) to LTE GTP tunnel identifiers (e.g., TEIDs), and/or may map PDU Session identifiers to EPS Bearer identifiers, to facilitate the establishment of user plane communications between LTE UE 107 and the selected slice of 5G core network 109. For example, as discussed above, LTE-5G IWF 105 may identify a particular AMF 203 associated with the selected slice, and may initiate the user plane communication establishment with the selected slice by outputting an Initial UE Message to the particular AMF 203.

Figure 12:
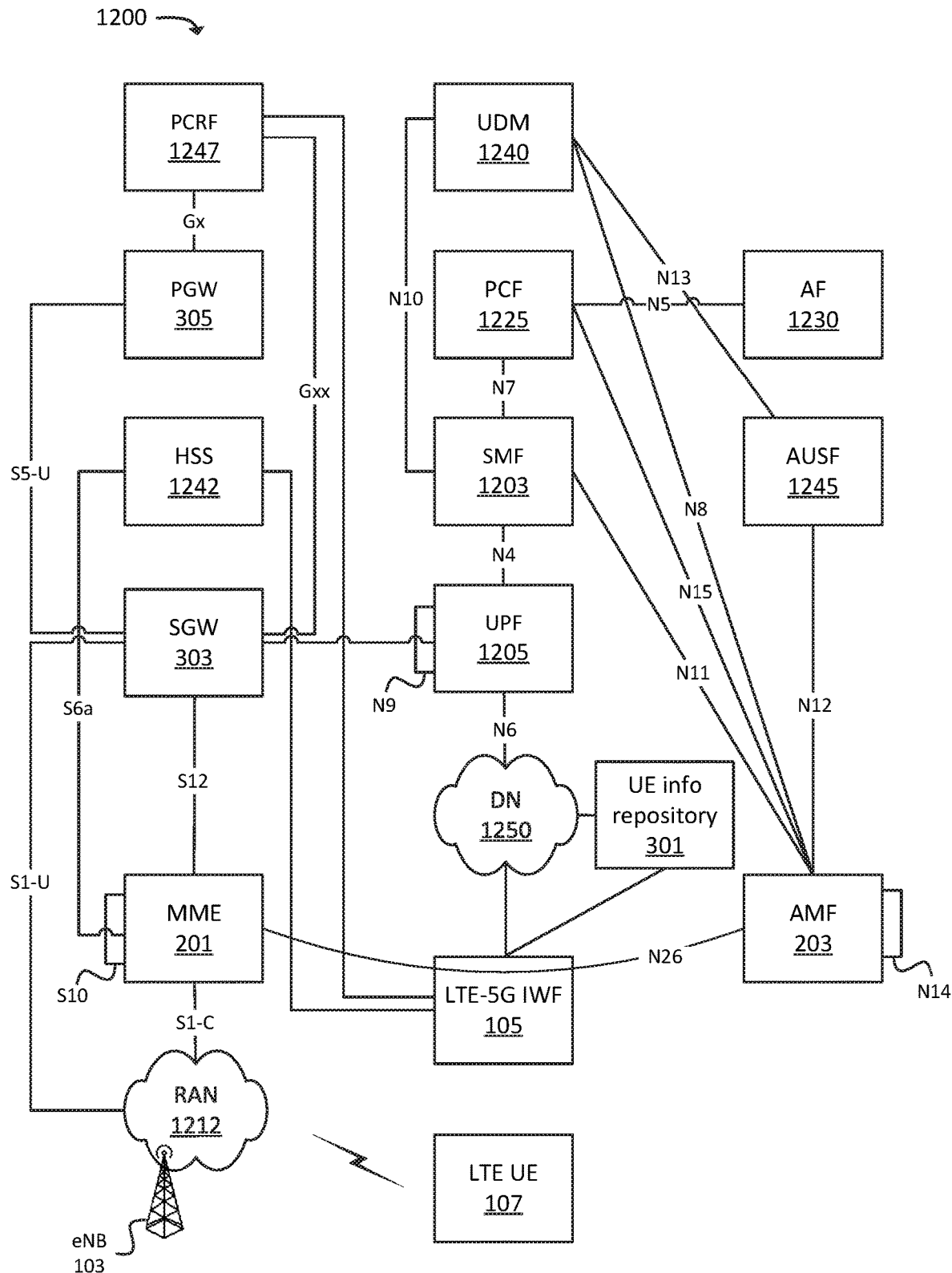
FIG. 12 illustrates an example environment in which one or more embodiments, described herein, may be implemented.

FIG. 12 illustrates an example environment 1200, in which one or more embodiments may be implemented. In some embodiments, environment 1200 may include elements of a 5G core network. In some embodiments, environment 1200 may correspond to a 5G Non-Standalone ("NSA") architecture, in which a LTE RAT may be used in conjunction with a 5G core network. While not explicitly shown here, similar concepts may apply in environments that include an LTE core network and/or a 5G RAN that implements one or more 5G RATs.

As shown, environment 1200 may include LTE UE 107, LTE RAN 1212 (which may include one or more one or more eNBs 103), MME 201, AMF 203, SMF 1203, Policy Control Function ("PCF") 1225, UPF 1205, UDM 1240, HSS 1242, Authentication Server Function ("AUSF") 1245, SGW 303, PGW 305, UE information repository 301, and Data Network ("DN") 1250.

Portions of environment 1200 may correspond to a LTE EPS network, such as LTE RAN 1212, eNB 103, MME 201, SGW 303, and HSS 1242. Portions of environment 1200 may correspond to a 5G core network, such as AMF 203, NEF 303, SMF 1203, UPF 1205, PCF 1225, AF 1230, UDM 1240, and AUSF 1245. While not explicitly shown in FIG. 12, environment 1200 may include additional, fewer, different, or differently arranged elements the LTE EPS and/or of the 5G core network. Further, in some embodiments, environment 1200 may include a 5G RAN (e.g., as implemented by one or more gNBs) and/or a RAN that implements another type of RAT (e.g., a Third Generation ("3G") RAT, and/or some other RAT). For the sake of brevity, only some portions of the LTE EPS network and the 5G core network are described here.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. Alternatively, or additionally, one or more of the devices of environment 1200 may perform one or more functions described as being performed by another one or more of the devices of environment 1200. Devices of environment 1200 may interconnect with each other and/or other devices via wired connections, wireless connections, or a combination of wired and wireless connections. In some implementations, one or more devices of environment 1200 may be physically integrated in, and/or may be physically attached to, one or more other devices of environment 1200.

LTE UE 107 may include a computation and communication device, such as a wireless mobile communication device that is capable of communicating with LTE RAN 1212, DN 1250, one or more devices or systems via DN 1250, etc. LTE UE 107 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, a IoT device (e.g., a sensor, a smart home appliance, or the like), a wearable device, a M2M device, or another type of mobile computation and communication device. As provided for herein, LTE UE 107 may send traffic to and/or receive traffic (e.g., user plane traffic) from DN 1250 via SGW 303, LTE RAN 1212, and/or UPF 1205.

While described herein in the context of LTE UE 107 being an "LTE UE," in practice, LTE UE 107 may be a "dual mode" or "multi mode" UE that is capable of communicating via a 5G RAT and/or some other type of RAT. For example, if LTE UE 107 is capable of communicating via an LTE RAT and a 5G RAT, LTE UE 107 may communicate using a 5G RAT when in communication range of a 5G RAN (e.g., as implemented by a gNB), and may communicate using an LTE RAT when in communication range of a LTE RAN.

LTE RAN 1212 may be, or may include, an LTE RAN that includes one or more base stations (e.g., one or more eNBs 103), via which LTE UE 107 may communicate with one or more other elements of environment 1200. LTE UE 107 may communicate with LTE RAN 1212 via an air interface (e.g., as provided by eNB 103). For instance, RAN 1210 may receive traffic (e.g., voice call traffic, data traffic, messaging traffic, signaling traffic, etc.) from LTE UE 107 via the air interface, and may communicate the traffic to UPF 1205, and/or one or more other devices or networks. Similarly, RAN 1210 may receive traffic intended for LTE UE 107 (e.g., from UPF 1205, SGW 303, and/or one or more other devices or networks) and may communicate the traffic to LTE UE 107 via the air interface.

AMF 203 may include one or more devices, systems, Virtualized Network Functions ("VNFs"), etc., that perform operations to register LTE UE 107 with the 5G network, to establish bearer channels associated with a PDU session with LTE UE 107, to hand off LTE UE 107 from the 5G network to another network, to hand off LTE UE 107 from the other network to the 5G network, and/or to perform other operations. In some embodiments, the 5G network may include multiple AMFs 203, which communicate with each other via the N14 interface (denoted in FIG. 12 by the line marked "N14" originating and terminating at AMF 203).

MME 201 may include one or more devices, systems, VNFs, etc., that perform operations to register LTE UE 107, to facilitate the establishment of bearer channels associated with LTE UE 107, to facilitate handovers of LTE UE 107, and/or to perform other operations. MME 201 may communicate with AMF 203 via an N26 interface. MME 201 may, in some embodiments, be implemented by the same device or system that implements LTE-5G IWF 105, and/or may be communicatively coupled with LTE-5G IWF 105. For example, MME 201 may communicate with LTE-5G IWF 105 via an N26 interface, and/or may instruct LTE-5G IWF 105 to communicate with AMF 203 via an N26 interface. As mentioned above, one or more MMES 201 may be "dedicated" MMES that are communicatively coupled to LTE-5G IWF 105, while other MMES 201 may be "non-dedicated" MMES that are not communicatively coupled to LTE-5G IWF 105. MMES 201 (e.g., dedicated and non-dedicated MMES) may communicate with each other via an S10 interface.

LTE-5G IWF 105 may include one or more devices, systems, VNFs, etc., that perform operations described herein. Generally speaking, for example, LTE-5G IWF 105 facilitate the establishment or modification of user plane communications between LTE UE 107 and UPF 1205, by communicating with elements of the LTE EPS network (e.g., MME 201) and elements of the 5G core network (e.g., AMF 203). LTE-5G IWF 105 may, for example, map 5G parameters or messages to LTE parameters or messages to facilitate the establishment or modification of such communications.

SGW 303 may include one or more devices, systems, VNFs, etc., that aggregate traffic received from one or more eNBs 103 and send the aggregated traffic to an external network or device via UPF 1205 and/or PGW 305. Additionally, SGW 303 may aggregate traffic received from one or more UPFs 1205 and/or PGW 305 and may send the aggregated traffic to one or more eNBs 103. SGW 303 may operate as an anchor for the user plane during inter-eNB handovers and as an anchor for mobility between different telecommunication networks or LTE RANs 1212.

SMF 1203 may include one or more devices, systems, VNFs, etc., that gather, process, store, and/or provide information in a manner described herein. SMF 1203 may, for example, facilitate in the establishment of communication sessions on behalf of LTE UE 107. In some embodiments, the establishment of communications sessions may be performed in accordance with one or more policies provided by PCF 1225.

PCF 1225 may include one or more devices, systems, VNFs, etc., that aggregate information to and from the 5G core network and/or other sources. PCF 1225 may receive information regarding policies and/or subscriptions from one or more sources, such as subscriber databases and/or from one or more users (such as, for example, an administrator associated with PCF 1225).

PCRF 1247 may include one or more devices, systems, VNFs, etc., that aggregate information to and from the LTE core network and/or other sources. PCRF 1247 may receive information regarding policies and/or subscriptions from one or more sources, such as subscriber databases and/or from one or more users (such as, for example, an administrator associated with PCRF 1247).

UPF 1205 and PGW 305 may include one or more devices, systems, VNFs, etc., that receive, store, and/or provide data (e.g., user plane data). For example, UPF 1205 and/or PGW 305 may receive user plane data (e.g., voice call traffic, data traffic, etc.), destined for LTE UE 107, from DN 1250, and may forward the user plane data toward LTE UE 107 (e.g., via LTE RAN 1212, SGW 303, and/or one or more other devices). In some embodiments, multiple UPFs 1205 may be deployed (e.g., in different geographical locations and/or for different traffic or service types), and the delivery of content to LTE UE 107 may be coordinated via the N9 interface (e.g., as denoted in FIG. 12 by the line marked "N9" originating and terminating at UPF 1205). Similarly, UPF 1205 and/or PGW 305 may receive traffic from LTE UE 107 (e.g., via RAN 1212, SGW 303, and/or one or more other devices), and may forward the traffic toward DN 1250. In some embodiments, UPF 1205 may communicate (e.g., via the N4 interface) with SMF 1203, regarding user plane data processed by UPF 1205.

UDM 1240, HSS 1242, UE information repository 301, and AUSF 1245 may include one or more devices, systems, VNFs, etc., that manage, update, and/or store profile information associated with one or more subscribers. UDM 1240, HSS 1242, UE information repository 301, and/or AUSF 1245 may perform authentication, authorization, and/or accounting operations associated with the subscriber and/or a communication session with LTE UE 107. One or more of these devices or systems may maintain information indicating particular Quality of Service ("QoS") levels that are associated with particular subscribers. In some embodiments, the QoS information may also be maintained on a per-traffic type basis, a per-device type basis, and/or some other basis. In this manner, UDM 1240, HSS 1242, UE information repository 301, and/or AUSF 1245 may be involved in processes where a QoS level for a given UE, subscriber, traffic flow, etc. is to be determined or verified. As shown in this example, UE information repository 301 may be "directly" communicatively coupled to LTE-5G IWF 105, and/or may communicate with UE information repository 301 via DN 1250.

DN 1250 may include one or more wired and/or wireless networks. For example, DN 1250 may include an IP-based PDN, a wide area network ("WAN") such as the Internet, a private enterprise network, and/or one or more other networks. LTE UE 107 may communicate, through DN 1250, with data servers, other UEs, and/or to other servers or applications that are coupled to DN 1250. DN 1250 may be connected to one or more other networks, such as a public switched telephone network ("PSTN"), a public land mobile network ("PLMN"), and/or another network. DN 1250 may be connected to one or more devices, such as content providers, applications, web servers, and/or other devices, with which LTE UE 107 may communicate.

Figure 13:
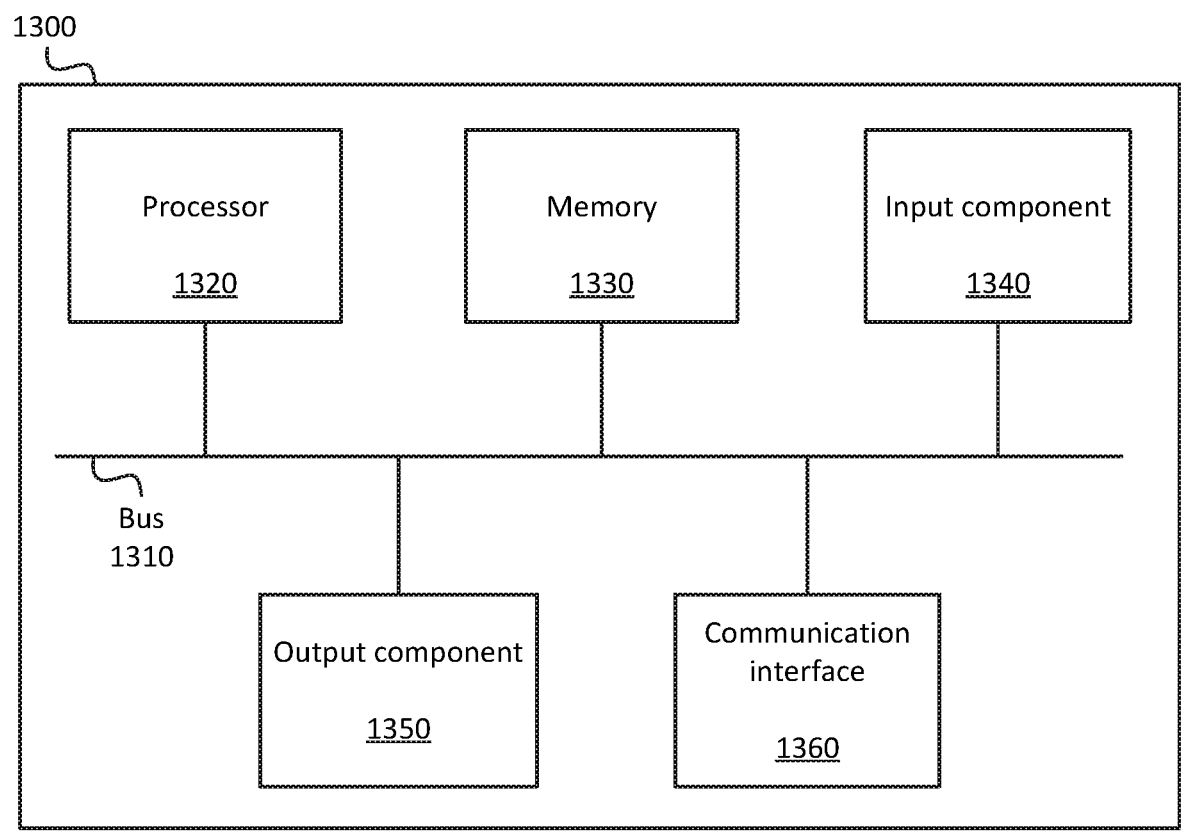
FIG. 13 illustrates example functional components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1 and 3-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
one or more processors configured to:
receive a first message associated with a User Equipment ("UE") that is communicatively coupled to an evolved Node B ("eNB") of a Long-Term Evolution ("LTE") radio access network ("RAN");
determine, based on receiving the first message, that user plane communications, associated with the UE, should be handled by a Fifth Generation ("5G") core network while the UE remains communicatively coupled to the eNB of the LTE RAN;
output, to one or more devices of the 5G core network and based on determining that the user plane communications associated with the UE should be handled by the 5G core network, a second message based on which the one or more devices of the 5G core network establish a user plane communication session;
receive, from the one or more devices of the 5G core network, an identifier associated with the user plane communication session; and
output the identifier associated with the user plane communication session to the eNB, wherein outputting the identifier associated with the user plane to the eNB facilitates communication between the UE and the one or more devices of the 5G core network via the user plane communication session without modifying signaling between the UE and the eNB of the LTE RAN.

2. The system of claim 1, wherein the UE is a first UE, wherein the one or more processors are further configured to:
receive a third message from a second UE that is communicatively coupled to the eNB of the LTE RAN;

determine, based on the third message, that user plane communications associated with the second UE should be handled by a LTE core network in lieu of the 5G core network; and based on determining that user plane communications associated with the second UE should be handled by the LTE core network, initiate a bearer establishment procedure to establish user plane communications between the second UE and one or more devices of the LTE core network.

3. The system of claim 1, wherein the first message includes an Attach Request message received from:
the eNB, or
a Mobility and Management Entity ("MME") that is communicatively coupled to the eNB.

4. The system of claim 1, wherein the first message is received from a first Mobility and Management Entity ("MME"), that is communicatively coupled to the eNB, by a second MME that is communicatively coupled to:
the first MME, and
an interworking device that is communicatively coupled to an Access and Mobility Management Function ("AMF") of the 5G core network.

5. The system of claim 1,
wherein determining that user plane communications associated with the UE should be handled by the 5G core network includes:
identifying a plurality of slices of the 5G core network; and
selecting a particular slice, of the plurality of slices, to handle the user plane communications associated with the UE; and
wherein outputting the second message to the one or more devices of the 5G core network includes outputting the second message to one or more devices associated with the selected particular slice of the 5G core network.

6. The system of claim 5, wherein selecting the particular slice of the 5G core network to handle the user plane communications associated with the UE includes:
identifying one or more Quality of Service ("QoS") levels associated with the UE or with a traffic type indicated in the first message; and
identifying that the particular slice corresponds to the identified QoS level.

7. The system of claim 5, wherein selecting the particular slice of the 5G core network to handle the user plane communications associated with the UE includes:
receiving information associated with the UE from a Home Subscriber Server ("HSS") associated with the LTE core network; and
selecting the particular slice based on the information received from the HSS.

8. A non-transitory computer-readable medium, storing a plurality of processor-executable instructions to:
receive a first message associated with a User Equipment ("UE") that is communicatively coupled to an evolved Node B ("eNB") of a Long-Term Evolution ("LTE") radio access network ("RAN");
determine, based on receiving the first message, that user plane communications, associated with the UE, should be handled by a Fifth Generation ("5G") core network while the UE remains communicatively coupled to the eNB of the LTE RAN;
output, to one or more devices of the 5G core network and based on determining that the user plane communications associated with the UE should be handled by the 5G core network, a second message based on which the one or more devices of the 5G core network establish a user plane communication session;
receive, from the one or more devices of the 5G core network, an identifier associated with the user plane communication session; and
output the identifier associated with the user plane communication session to the eNB, wherein outputting the identifier associated with the user plane to the eNB facilitates communication between the UE and the one or more devices of the 5G core network via the user plane communication session without modifying signaling between the UE and the eNB of the LTE RAN.

9. The non-transitory computer-readable medium of claim 8, wherein the UE is a first UE, wherein the plurality of processor-executable instructions further include processor-executable instructions to:
receive a third message from a second UE that is communicatively coupled to the eNB of the LTE RAN;
determine, based on the third message, that user plane communications associated with the second UE should be handled by a LTE core network in lieu of the 5G core network; and
based on determining that user plane communications associated with the second UE should be handled by the LTE core network, initiate a bearer establishment procedure to establish user plane communications between the second UE and one or more devices of the LTE core network.

10. The non-transitory computer-readable medium of claim 8, wherein the first message includes an Attach Request message received from:
the eNB, or
a Mobility and Management Entity ("MME") that is communicatively coupled to the eNB.

11. The non-transitory computer-readable medium of claim 8, wherein the first message is received from a first Mobility and Management Entity ("MME"), that is communicatively coupled to the eNB, by a second MME that is communicatively coupled to:
the first MME, and
an interworking device that is communicatively coupled to an Access and Mobility Management Function ("AMF") of the 5G core network.

12. The non-transitory computer-readable medium of claim 8,
wherein determining that user plane communications associated with the UE should be handled by the 5G core network includes:
identifying a plurality of slices of the 5G core network; and
selecting a particular slice, of the plurality of slices, to handle the user plane communications associated with the UE; and
wherein outputting the second message to the one or more devices of the 5G core network includes outputting the second message to one or more devices associated with the selected particular slice of the 5G core network.

13. The non-transitory computer-readable medium of claim 12, wherein selecting the particular slice of the 5G core network to handle the user plane communications associated with the UE includes:
identifying one or more Quality of Service ("QoS") levels associated with the UE or with a traffic type indicated in the first message; and
identifying that the particular slice corresponds to the identified QoS level.

14. The non-transitory computer-readable medium of claim 12, wherein selecting the particular slice of the 5G core network to handle the user plane communications associated with the UE includes:
   receiving information associated with the UE from a Home Subscriber Server ("HSS") associated with the LTE core network; and
   selecting the particular slice based on the information received from the HSS.

15. A method, comprising:
   receiving a first message associated with a User Equipment ("UE") that is communicatively coupled to an evolved Node B ("eNB") of a Long-Term Evolution ("LTE") radio access network ("RAN");
   determining, based on receiving the first message, that user plane communications, associated with the UE, should be handled by a Fifth Generation ("5G") core network while the UE remains communicatively coupled to the eNB of the LTE RAN;
   outputting, to one or more devices of the 5G core network and based on determining that the user plane communications associated with the UE should be handled by the 5G core network, a second message based on which the one or more devices of the 5G core network establish a user plane communication session;
   receiving, from the one or more devices of the 5G core network, an identifier associated with the user plane communication session; and
   outputting the identifier associated with the user plane communication session to the eNB, wherein outputting the identifier associated with the user plane to the eNB facilitates communication between the UE and the one or more devices of the 5G core network via the user plane communication session without modifying signaling between the UE and the eNB of the LTE RAN.

16. The method of claim 15, wherein the UE is a first UE, the method further comprising:
   receiving a third message from a second UE that is communicatively coupled to the eNB of the LTE RAN;
   determining, based on the third message, that user plane communications associated with the second UE should be handled by a LTE core network in lieu of the 5G core network; and
   based on determining that user plane communications associated with the second UE should be handled by the LTE core network, initiating a bearer establishment procedure to establish user plane communications between the second UE and one or more devices of the LTE core network.

17. The method of claim 15, wherein the first message is received from a first Mobility and Management Entity ("MME"), that is communicatively coupled to the eNB, by a second MME that is communicatively coupled to:
   the first MME, and
   an interworking device that is communicatively coupled to an Access and Mobility Management Function ("AMF") of the 5G core network.

18. The method of claim 15,
   wherein determining that user plane communications associated with the UE should be handled by the 5G core network includes:
      identifying a plurality of slices of the 5G core network; and
      selecting a particular slice, of the plurality of slices, to handle the user plane communications associated with the UE; and
   wherein outputting the second message to the one or more devices of the 5G core network includes outputting the second message to one or more devices associated with the selected particular slice of the 5G core network.

19. The method of claim 18, wherein selecting the particular slice of the 5G core network to handle the user plane communications associated with the UE includes:
   identifying one or more Quality of Service ("QoS") levels associated with the UE or with a traffic type indicated in the first message; and
   identifying that the particular slice corresponds to the identified QoS level.

20. The method of claim 18, wherein selecting the particular slice of the 5G core network to handle the user plane communications associated with the UE includes:
   receiving information associated with the UE from a Home Subscriber Server ("HSS") associated with the LTE core network; and
   selecting the particular slice based on the information received from the HSS.

* * * * *